(12) United States Patent
Monroe

(10) Patent No.: US 7,634,662 B2
(45) Date of Patent: Dec. 15, 2009

(54) METHOD FOR INCORPORATING FACIAL RECOGNITION TECHNOLOGY IN A MULTIMEDIA SURVEILLANCE SYSTEM

(76) Inventor: David A. Monroe, 7800 IH-10 West, #700, San Antonio, TX (US) 78230

( * ) Notice: Subject to any disclaimer, the term of this patent is extended or adjusted under 35 U.S.C. 154(b) by 888 days.

(21) Appl. No.: 10/719,792

(22) Filed: Nov. 21, 2003

(65) Prior Publication Data

US 2004/0117638 A1    Jun. 17, 2004

Related U.S. Application Data

(60) Provisional application No. 60/428,096, filed on Nov. 21, 2002.

(51) Int. Cl.
*G06K 9/46* (2006.01)
*G06K 9/60* (2006.01)
*G06F 21/06* (2006.01)

(52) U.S. Cl. .................. 713/186; 382/117; 382/118

(58) Field of Classification Search ............... 713/186
See application file for complete search history.

(56) References Cited

U.S. PATENT DOCUMENTS

| | | |
|---|---|---|
| 4,163,283 A | 7/1979 | Darby |
| 4,179,695 A | 12/1979 | Levine et al. |
| 4,197,536 A | 4/1980 | Levine |
| 4,516,125 A | 5/1985 | Schwab et al. |
| 4,831,438 A | 5/1989 | Bellman, Jr. et al. |
| 4,845,629 A | 7/1989 | Murge |
| 4,857,912 A | 8/1989 | Everett, Jr. et al. |
| 4,891,650 A | 1/1990 | Sheffer |
| 4,910,692 A | 3/1990 | Outram |
| 5,027,104 A | 6/1991 | Reid |
| 5,027,114 A | 6/1991 | Kawashime et al. |
| 5,091,780 A | 2/1992 | Pomerleau |
| 5,109,278 A | 4/1992 | Erickson |

(Continued)

FOREIGN PATENT DOCUMENTS

EP    220752    5/1987

(Continued)

OTHER PUBLICATIONS

Apr. 1966, Apollo Unified S-Band System, NASA-Goddard Space Flight Center, Greenbelt, Maryland.

(Continued)

*Primary Examiner*—David García Cervetti
*Assistant Examiner*—Fatoumata Traore

(57) ABSTRACT

Embodiment provide a surveillance camera adapted to be connected to an internet protocol network, the surveillance camera including at least one facial processor, at least one facial recognition algorithm embodied in suitable media, at least one facial recognition algorithm executable with digital format image data by at least one facial processor detecting faces, execution of at least one facial recognition algorithm producing unique facial image data, execution of at least one facial separation algorithm producing facial separation data, at least one facial processor in communication with at least one facial signature database to obtain reference data, execution of at least one facial signature algorithm comparing facial separation data and reference data to identify correlations, at least one compression algorithm producing compressed image data, and a network stack configured to transmit to the network unique facial image data for each detected face and compressed image data.

34 Claims, 15 Drawing Sheets

U.S. PATENT DOCUMENTS

| | | |
|---|---|---|
| 5,111,291 A | 5/1992 | Erickson |
| 5,166,746 A | 11/1992 | Sato et al. |
| 5,218,367 A | 6/1993 | Sheffer et al. |
| 5,243,340 A | 9/1993 | Norman et al. |
| 5,243,530 A | 9/1993 | Stanifer et al. |
| 5,268,698 A | 12/1993 | Smith, Sr. et al. |
| 5,283,643 A | 2/1994 | Fujimoto |
| 5,321,615 A | 6/1994 | Frisbie et al. |
| 5,334,982 A | 8/1994 | Owen |
| 5,341,194 A | 8/1994 | Haneda et al. |
| 5,400,031 A | 3/1995 | Fitts |
| 5,408,330 A | 4/1995 | Squicciarini et al. |
| 5,432,838 A | 7/1995 | Purchase |
| 5,440,337 A | 8/1995 | Henderson et al. |
| 5,440,343 A | 8/1995 | Parulski |
| 5,448,243 A | 9/1995 | Bethke et al. |
| 5,463,595 A | 10/1995 | Rochall et al. |
| 5,469,371 A | 11/1995 | Bass |
| 5,497,149 A | 3/1996 | Fast |
| 5,508,736 A | 4/1996 | Cooper |
| 5,509,009 A | 4/1996 | Laycock |
| 5,530,440 A | 6/1996 | Denzer et al. |
| 5,553,609 A | 9/1996 | Chen et al. |
| 5,557,254 A | 9/1996 | Johnson et al. |
| 5,557,278 A | 9/1996 | Piccirillo |
| 5,598,167 A | 1/1997 | Zjderhand |
| 5,612,668 A | 3/1997 | Scott |
| 5,627,753 A | 5/1997 | Brankin et al. |
| 5,629,691 A | 5/1997 | Jain |
| 5,636,122 A | 6/1997 | Shah et al. |
| 5,642,285 A | 6/1997 | Woo |
| 5,666,157 A | 9/1997 | Aviv |
| 5,670,961 A | 9/1997 | Tomote et al. |
| 5,677,979 A | 10/1997 | Squicciarini et al. |
| 5,689,442 A | 11/1997 | Swanson et al. |
| 5,712,679 A | 1/1998 | Coles |
| 5,712,899 A | 1/1998 | Pace, II |
| 5,714,948 A | 2/1998 | Farmakis et al. |
| 5,742,336 A | 4/1998 | Lee |
| 5,751,346 A | 5/1998 | Dozier |
| 5,777,551 A | 7/1998 | Hess |
| 5,777,580 A | 7/1998 | Janky et al. |
| 5,793,416 A | 8/1998 | Rostoker et al. |
| 5,835,059 A | 11/1998 | Nadel et al. |
| 5,850,180 A | 12/1998 | Hess |
| 5,867,804 A | 2/1999 | Pilley et al. |
| 5,917,405 A | 6/1999 | Joao |
| 5,926,210 A | 7/1999 | Hackett et al. |
| 5,933,098 A | 8/1999 | Haxton |
| 5,938,706 A | 8/1999 | Feldman |
| 5,974,158 A | 10/1999 | Auty et al. |
| 5,982,418 A * | 11/1999 | Ely .......................... 348/153 |
| 5,983,161 A | 11/1999 | Lemelson et al. |
| 5,999,116 A | 12/1999 | Evers |
| 6,002,427 A | 12/1999 | Kipust |
| 6,009,356 A | 12/1999 | Monroe |
| 6,067,571 A | 5/2000 | Igarashi et al. |
| 6,069,655 A | 5/2000 | Seeley |
| 6,078,850 A | 6/2000 | Kane et al. |
| 6,084,510 A | 7/2000 | Lemelson et al. |
| 6,092,008 A | 7/2000 | Bateman |
| 6,100,964 A | 8/2000 | De Cremiers |
| 6,133,941 A | 10/2000 | Ono |
| 6,154,658 A | 11/2000 | Caci |
| 6,157,317 A | 12/2000 | Walker |
| 6,181,373 B1 | 1/2001 | Coles |
| 6,195,609 B1 | 2/2001 | Pilley et al. |
| 6,226,031 B1 | 5/2001 | Barraclough et al. |
| 6,246,320 B1 | 6/2001 | Monroe |
| 6,259,475 B1 | 7/2001 | Ramachandran et al. |
| 6,275,231 B1 | 8/2001 | Obradovich |
| 6,278,965 B1 | 8/2001 | Glass et al. |
| 6,282,488 B1 | 8/2001 | Castor et al. |
| 6,292,098 B1 | 9/2001 | Ebata |
| 6,356,625 B1 | 3/2002 | Castelani |
| 6,385,772 B1 | 5/2002 | Courtney |
| 6,424,370 B1 | 7/2002 | Courtney |
| 6,462,697 B1 | 10/2002 | Klamer et al. |
| 6,476,858 B1 | 11/2002 | Ramirez Diaz et al. |
| 6,504,479 B1 | 1/2003 | Lemons |
| 6,522,352 B1 | 2/2003 | Strandwitz et al. |
| 6,525,761 B2 | 2/2003 | Sato et al. |
| 6,549,130 B1 | 4/2003 | Joao |
| 6,556,241 B1 | 4/2003 | Yoshimura et al. |
| 6,570,610 B1 | 5/2003 | Kipust |
| 6,584,082 B1 * | 6/2003 | Willis et al. ................. 370/316 |
| 6,628,835 B1 | 9/2003 | Brill |
| 6,646,676 B1 | 11/2003 | DaGraca |
| 6,662,649 B1 | 12/2003 | Knight et al. |
| 6,675,386 B1 | 1/2004 | Hendricks et al. |
| 6,698,021 B1 | 2/2004 | Amini |
| 6,714,236 B1 * | 3/2004 | Wada et al. ................. 348/152 |
| 6,720,990 B1 | 4/2004 | Walker et al. |
| 6,853,739 B2 * | 2/2005 | Kyle ......................... 382/115 |
| 6,940,545 B1 * | 9/2005 | Ray et al. ................. 348/222.1 |
| 7,113,971 B1 | 9/2006 | Ohi et al. |
| 7,177,448 B1 * | 2/2007 | Sah .......................... 382/107 |
| 7,200,755 B2 * | 4/2007 | Hamid et al. ............... 713/186 |
| 7,221,809 B2 * | 5/2007 | Geng ........................ 382/280 |
| 2002/0019811 A1 * | 2/2002 | Lapsley et al. ................ 705/44 |
| 2002/0051061 A1 * | 5/2002 | Peters et al. ................ 348/207 |
| 2003/0071899 A1 | 4/2003 | Joao |
| 2003/0126121 A1 * | 7/2003 | Khan et al. .................... 707/3 |
| 2003/0142853 A1 * | 7/2003 | Waehner et al. ............. 382/118 |
| 2003/0210139 A1 * | 11/2003 | Brooks et al. ............... 340/531 |
| 2004/0052450 A1 * | 3/2004 | Morrison ..................... 385/24 |
| 2005/0055727 A1 | 3/2005 | Creamer et al. |
| 2005/0130803 A1 | 6/2005 | Rastegar |

FOREIGN PATENT DOCUMENTS

| | | |
|---|---|---|
| EP | 232031 | 8/1987 |
| EP | 532110 | 3/1993 |
| EP | 209397 | 7/1993 |
| EP | 613109 | 8/1994 |
| EP | 613110 | 8/1994 |
| EP | 744630 | 11/1996 |
| EP | 785536 | 7/1997 |
| EP | 613111 | 8/1998 |
| JP | 6-301898 | 10/1994 |
| JP | 9-282600 | 10/1997 |
| JP | HEI-10-66058 | 3/1998 |
| JP | A-10-155040 | 6/1998 |
| JP | 9-251599 | 4/1999 |
| JP | 11-160424 | 6/1999 |
| WO | WO90/04242 | 4/1990 |
| WO | WO95/27910 | 10/1995 |
| WO | WO96/12265 | 4/1996 |
| WO | WO97/23096 | 6/1997 |
| WO | WO9737336 | 10/1997 |
| WO | WO98/52174 | 11/1999 |
| WO | WO00/36807 | 6/2000 |

OTHER PUBLICATIONS

Nov. 24, 1997, TELEXIS ViaNet General Information Booklet Version 1.3.

2000, ViaNet 3000 Administrator's Manual Version 1.1-NetXpress Video by TELEXIS, Kanata, Ontario, Canada.

1999, ViaNet 3000 Operator Manual Version 1.0 by TELEXIS-NetXpress Video, Kanata, Ontario, Canada.

1999, ViaNet 3000 Administrator Manual Version 1.0-NetXpress Video by TELEXIS, Kanata, Ontario, Canada.

1999, ViaNet 3000 Instruction Manual Operator's Revision 1-NetXpress Video by TELEXIS, Kanata, Ontario, Canada.

Nov. 24, 1976, TELEXIS ViaNet General Information Booklet Version 1.3.

2000, ViaNet 3000 Administrator's Manual Version 1.1- NetXpress Video by TELEXIS, Kanata, Ontario, Canada.

1999 Vianet 3000 Operator Manual Version 1.0—NetXpress Video by TELEXIS, Kanata, Ontario, Canada.

1999 ViaNet 3000 Administrator Manual Version 1.0—NetXpress Video by TELEXIS, Kanata, Ontario, Canada.

1999 ViaNet 3000 Instruction Manual Operator's Revision 1—NetXpress Video by TELEXIS, Kanata, Ontario, Canada.

* cited by examiner

SIGNATURE DATABASE

FACIAL SIGNATURE#    NAME
AGE
HEIGHT
ALIASES
MUGSHOT URL
BIO FILE URL
IMAGE ID #1
IMAGE ID #2
IMAGE ID #3
"
"
IMAGE ID #LAST

IMAGE DATABASE

IMAGE ID#    DATE/TIME
LOCATION
CAMERA #
IMAGE FILE URL
DETECTED FACIAL SIGNATURE #1
DETECTED FACIAL SIGNATURE #2
DETECTED FACIAL SIGNATURE #3
"
"
DETECTED FACIAL SIGNATURE #LAST

FIG. 5

METHOD FOR INCORPORATING FACIAL RECOGNITION TECHNOLOGY IN A MULTIMEDIA SURVEILLANCE SYSTEM

CROSS REFERENCE TO RELATED APPLICATION

This application claims the priority of U.S. Provisional Application Ser. No. 60/428,096, filed on Nov. 21, 2002.

BACKGROUND OF THE INVENTION

1. Field of the Invention

The invention generally relates to use of facial recognition technology as used in surveillance and access systems and is specifically directed to incorporation of such technology in an IP compatible, networked, comprehensive multimedia surveillance system.

2. Discussion of the Prior Art

My earlier patents and applications have covered various aspects of the networked multimedia surveillance system in detail. My following earlier patents and pending applications are incorporated herein by reference:

---

Serial #10/192,870　　　　Filing Date: Jul. 10, 2002
Title: Comprehensive Multi-Media Surveillance and Response System for Aircraft, Operations Centers, Airports and Other Commercial Transports, Centers and Terminals
Serial #08/738,487　　　　Filing Date: Oct. 28, 1996
Patent #5,798,458　　　　Issue Date: Aug. 25, 1998
Title: Acoustic Catastrophic Event Detection and Data Capture and Retrieval System for Aircraft
Serial #08/745,536　　　　Filing Date: Nov. 12, 1996
Patent #6,009,356　　　　Issue Date: Dec. 28, 1999
Title: Wireless Transducer Data Capture and Retrieval System for Aircraft
Serial #08/815,026　　　　Filing Date: Mar. 14, 1997
Patent #5,943,140　　　　Issue Date: Aug. 24, 1999
Title: Method and Apparatus for Sending and Receiving Facsimile Transmissions Over a Non-Telephonic Transmission System
Serial #09/143,232　　　　Filing Date: Aug. 28, 1998
Title: Multifunctional Remote Control System for Audio Recording, Capture, Transmission and Playback of Full Motion and Still Images
Serial #09/257,448　　　　Filing Date: Feb. 25, 1999
Title: Multi-Casting Communication Protocols for Simultaneous Transmission to Multiple Stations
Serial #09/257,720　　　　Filing Date: Feb. 25, 1999
Patent #6,392,692　　　　Issue Date: May 21, 2002
Title: Network Communication Techniques for Security Surveillance and Safety System
Serial #09/257,765　　　　Filing Date: Feb. 25, 1999
Patent #6,366,311　　　　Issue Date: Apr. 02, 2002
Title: Record and Playback System for Aircraft
Serial #09/257,767　　　　Filing Date: Feb. 25, 1999
Patent #6,246,320　　　　Issue Date: Jun. 12, 2001
Title: Ground Link With On-Board Security Surveillance System for Aircraft and Other Commercial Vehicles
Serial #09/257,769　　　　Filing Date: Feb. 25, 1999
Title: Ground Based Security Surveillance System for Aircraft and Other Commercial Vehicles
Serial #09/257,802　　　　Filing Date: Feb. 25, 1999
Patent #6,253,064　　　　Issue Date: Jun. 26, 2001
Title: Terminal Based Traffic Management and Security Surveillance System for Aircraft and Other Commercial Vehicles
Serial #09/593,901　　　　Filing Date: Jun. 14, 2000
Title: Dual Mode Camera
Serial #09/594,041　　　　Filing Date: Jun. 14, 2000
Title: Multimedia Surveillance and Monitoring System Including Network Configuration -continued Serial #09/687,713　　　　Filing Date: Oct. 13, 2000
Title: Apparatus and Method of Collecting and Distributing Event Data to Strategic Security Personnel and Response Vehicles
Serial #09/966,130　　　　Filing Date: Sep. 21, 2001
Title: Multimedia Network Appliances for Security and Surveillance Applications
Serial #09/974,337　　　　Filing Date: Oct. 10, 2001
Title: Networked Personal Security System
Serial #09/715,783　　　　Filing Date: Nov. 17, 2000
Title: Multiple Video Display Configurations and Bandwidth Conservation Scheme for Transmitting Video Over a Network
Serial #09/716,141　　　　Filing Date: Nov. 17, 2000
Title: Method and Apparatus for Distributing Digitized Streaming Video Over a Network
Serial #09/725,368　　　　Filing Date: Nov. 29, 2000
Title: Multiple Video Display Configurations and Remote Control of Multiple Video Signals Transmitted to a Monitoring Station Over a Network
Serial #09/853,274　　　　Filing Date: May 11, 2001
Title: Method and Apparatus for Collecting, Sending, Archiving and Retrieving Motion Video and Still Images and Notification of Detected Events
Serial #09/854,033　　　　Filing Date: May 11, 2001
Title: Portable, Wireless Monitoring and Control Station for Use in Connection With a Multi-Media Surveillance System Having Enhanced Notification Functions
Serial #09/866,984　　　　Filing Date: May 29, 2001
Title: Modular Sensor Array
Serial #09/960,126　　　　Filing Date: Sep. 21, 2001
Title: Method and Apparatus for Interconnectivity Between Legacy Security Systems and Networked Multimedia Security Surveillance System
Serial #10/134,413　　　　Filing Date: Apr. 29, 2002
Title: Method for Accessing and Controlling a Remote Camera in a Networked System With Multiple User Support Capability and Integration to Other Sensor Systems

---

Several companies have developed computer algorithms that are capable of producing a "digital signature" from video images of people's faces. These signatures are much like a fingerprint: they are unique to individuals; they are relatively small so they are efficient; and, they may be used in databases to look up the identity and other data about the person.

While other types of biometrics, such as iris scanning, are at best or even more accurate than facial recognition (which has a relatively low error rate; just under 1 percent), facial recognition will probably be accepted more widely because it is not intrusive. Further, it does not require that the user push, insert or click on anything. Companies often do not need to install anything beyond the new software because most already have cameras in place and pictures of employees on file—making it less expensive than iris reading setups. In addition, the relatively small size of the database for a facial profile makes it an attractive technology.

One example of a currently available facial recognition software is the Visionics' FaceIt system. The FaceIt software measures a face according to its peaks and valleys—such as the tip of the nose, the depth of the eye sockets—which are known as nodal points. A typical human face has 80 nodal points and precise recognition can be achieved with as few as 14 to 22 utilizing the FaceIt system. Specifically, the FaceIt system concentrates on the inner region of the face, which runs from temple to temple and just over the lip, called the 'golden triangle.' This is the most stable because even if facial hair such as a beard is altered, or if the subject changes or adds glasses, changes in weight or ages substantially the 'golden triangle' region tends to not be affected, while places such as under chin would be substantially altered. FaceIt plots the relative positions of these points and comes up with a long string of numbers, called a faceprint.

Visage Technology of Littleton, Mass., has a slightly different model. Its software compares faces to 128 archetypes it has on record. Faces are then assigned numbers according to how they are similar or different from these models. The Visage Technology has been utilized to date in the identification of criminals, for access control, for transaction security and for identity fraud prevention.

Most recently, government and aviation officials are poised to begin using facial recognition systems to scan airport terminals for suspected terrorists. Recently, Visionics has teamed up with a domestic airline to demonstrate a conceptual boarding system that will use FaceIt to facilitate the rapid boarding of the airline's frequent flyers.

In the past, law enforcement officials often have no more than a facial image to link a suspect to a particular crime or previous event. Up to now, database searches were limited to textual entries (i.e., name, social security number, birth date, etc.), leaving room for error and oversight. By conducting searches against facial images, the facial recognition technology permits rapid review of information and quickly generated results, with the ability to check literally millions of records for possible matches, and then automatically and reliably verifying the identity of a suspect.

The facial recognition technology has several advantages over other biometric systems. For example, with facial recognition technology a person can be identified at a distance or in a crowd. The technology has the capability of capturing a face in the field of view, extract the face from the background data and compare it against a database.

The system permits the creation of watch lists or the like. This could include, for example, known shoplifters, terrorists or criminals, as well as frequent customers, VIP's, expected visitors or individuals generally classified as friends or foes. The system can be used at airports, casinos, public buildings, schools, subways, colleges, factories, business facilities, housing complexes, residences and the like.

The system also is useful in transaction modes. Customers are used to being verified or being recognized by their face at retail locations by providing merchants with a driver's license or other form of photo ID. In sharp contrast to today's widely used signature verification process, which is highly unreliable and cannot be accurately determined by unskilled and untrained clerks, face recognition makes verification reliable, automatic and fast. In banking, facial recognition technology can adapt to already installed ATM cameras for recognizing and verifying customer identities so the financial transaction can be quickly and effortlessly conducted. Such technology can replace reliance on alphanumeric PINs to identify and authenticate a user.

Face recognition is the only biometric that can be used in two modalities—logon and continuous monitoring. An example of logon modality is use as a perimeter defense mechanism, where an authorized individual gains entry to a network or session after a one-time logon process. This is the typical mode for all biometric systems. In addition, face recognition supports a continuous monitoring mode where persons are continuously authenticated for ensuring that at all times the individual in front of the computer or handheld device continues to be the same authorized person who logged in.

Currently available technology focuses on the following aspects of facial recognition:

Detection—When the system is attached to a video surveillance system, the recognition software searches the field of view of a video camera for faces. If there is a face in the view, it is detected within a fraction of a second. A multi-scale algorithm is used to search for faces in low resolution. The system switches to a high-resolution search only after a head-like shape is detected.

Alignment—Once a face is detected, the system determines the head's position, size and pose to assure that the face is appropriately turned toward the camera for the system to register it.

Normalization—The image of the head is scaled and rotated so that it can be registered and mapped into an appropriate size and pose. Normalization is performed regardless of the head's location and distance from the camera.

Representation—The system translates the facial data into a unique code. This coding process allows for easier comparison of the newly acquired facial data to stored facial data.

Matching—The newly acquired facial data is compared to the stored data and linked to at least one stored facial representation.

The heart of current facial recognition systems is the algorithm. This is the mathematical technique the system uses to encode faces. The system maps the face and creates a faceprint, a unique numerical code for that face. Once the system has stored a faceprint, it can compare it to the thousands or millions of faceprints stored in a database. In the FaceIt system, each faceprint requires an 84-byte file. The FaceIt system can match multiple faceprints at a rate of up to 60 million per minute. As comparisons are made, the system assigns a value to the comparison using a scale of 1 to 10. If a score is above a predetermined threshold, a match is declared. The operator then views the two photos that have been declared a match to be certain that the computer is accurate.

As the facial recognition technology develops, expanding uses are desirable. A comprehensive, system approach incorporating this technology with other legacy, digital and IP system architectures is needed. A comprehensive, coordinated approach utilizing this technology with known surveillance techniques and with system collection, distribution and management techniques will be required to maximize the value of this and other biometric recognition technologies.

SUMMARY OF THE INVENTION

The subject invention is directed to the integration of facial recognition capability into a multimedia security system with IP compatibility for enhancing the collection, distribution and management of recognition data by utilizing the system's cameras, databases, monitor stations, and notification systems.

In its simplest configuration, a camera views a scene of interest, and a processor analyzes the video signals produced by the camera. The processor performs the steps of:

Facial Separation, e.g., locating human faces within the viewed scene,

Facial Signature generation, e.g., deriving a unique identifying descriptor for the detected faces, Database Creation, adding said descriptors and separated facial image to a comparison database, Database Lookup, matching the captured descriptors with previously-captured faces or images containing faces or other relevant data, and Generating alarms as appropriate.

The basic function of the system can be enhanced by dividing the processing function processors. One or more processors perform the computationally intensive tasks of Facial Separation and Facial Signature generation, while yet another processor performs the less demanding task of database pattern matching. This yields improved system economies and flexibility. Cameras and Facial Processors may be added incrementally to the system as needed, and as is unnecessary for each Facial Processor to contain or to access the entire 'reference' database.

In the subject invention, the basic facial recognition technology is incorporated into a networked surveillance system. In the preferred embodiment of the system, at least one camera, ideally an IP camera, is provided. This IP camera performs additional processing steps to the captured video; specifically the captured video is digitized, compressed into a convenient compressed file format, and sent to a network protocol stack for subsequent conveyance over a local or wide area network. Typical compression schemes include MPEG, JPEG, H.261 or H.263, wavelet, or a variety of proprietary compression schemes. A typical network topology is the popular Ethernet standard, IEEE 802.3, and may operate at speeds from 10 Mb/s to 100 Mb/s. Network protocols are typically TCP/IP, UDP/IP, and may be Unicast or Multicast as dictated by the system requirements.

The compressed digital video is transported via Local Area Network (LAN) or Wide Area Network (WAN) to a processor which performs the steps of Facial Separation, Facial Signature Generation, and Facial Database Lookup.

The utility of the system may be enhanced by the increased use of the networking techniques of the subject invention. In this enhancement, a group of networked processors perform the steps of Facial Separation and Facial Signature generation. The Facial Processors function as network resources, and are configured to process video from any networked camera, as required. This improves the flexibility and economics of the system. For example, during periods when a particular area is not used, Facial Processors may be diverted from analysis of that particular camera to an area of higher traffic. Also, the workload of a failed Facial Processor may be diverted to a different processor.

Other benefits arise from this configuration. For example, the Facial Database may be treated as a general-purpose network resource, allowing a greater number of cameras and Facial Processors to perform Facial Signature lookups at any given time. Moreover, the digital IP surveillance network is often part of a larger "network of networks", thus allowing the Facial Database to be consulted by devices on a different network. This is useful in cases where different organizations may have compiled different Facial Databases. For example, an airport may maintain a database of the Facial Signatures of all current employees, as well as of past employees. A law enforcement organization may maintain a separate database of known offenders, and an Intelligence organization may maintain a current database of foreign nationals of interest. In the depicted networked environment, the Facial Processors may consult several different Facial Databases, across the LAN or WAN.

An additional benefit arises from the fact that IP surveillance systems often maintain an archive of stored video or images. Since this archive is generally available on the network, it is possible to use the system to search for faces in archived images, during event reconstruction. In the preferred embodiment the IP surveillance network stores captured images or video in an Image Database. Often, these images are captured only when the associated camera has detected motion within its field-of-view, thus reducing the storage requirements of the image archive platform. Since the Image Database is a generally-available network resource, it is thus possible to perform the Facial Processing on these stored images as well as on live camera video.

For example, the Facial Processors and Facial Database detect the presence of a person of interest in some live scene. Using the image archive, it is possible to track the person's movements backward in time, thus re-constructing the person's movements through a facility. It is additionally possible, for example, to note whether the person-of-interest may have made contact with other people within the area being monitored. The system may then, upon command, derive a Facial Signature from that 'new' person's image, and add that new Facial Signature to the Facial Database. Historical analysis of the 'new' person's movements through the facility may then be performed, or the real-time location and movements of the 'new' person may be tracked.

The Facial Database and the Image Archive may be two distinct platforms, both resident on the LAN or WAN, or where desired both functions may be resident on the same physical platform.

In a further enhancement of the invention, the IP cameras include additional processing resources, and are thereby capable of performing the Facial Processing internally. The separate Facial Processors of the previous example are thereby eliminated. This approach allows improvement of the storage efficiency of the Image Database since images may, if desired, only be stored in the Image Archive if a face is recognized by one of the cameras, or if a particular predetermined face is detected by the Facial Database.

My previous applications and patents as listed above and as incorporated by reference herein describe a surveillance system wherein the IP cameras may produce multiple video streams as the system requirements may dictate. For example, the IP cameras may produce several motion MPEG video streams with different bandwidths (for different audiences), and may additionally produce a high-resolution still frame JPEG image for storage in an image database. The system may utilize any of these video streams for facial recognition. Since the cameras are IP-based, their motion video and still frame video streams are generally available upon demand throughout the network, and either type of video may be used to drive the Facial Recognition system. The still frame images have the advantage of greater resolution, but may be generated less frequently. Motion video sources may produce useful images more often, but at a reduced resolution. This reduced resolution decreases the accuracy of the Facial Recognition process.

Prior disclosures have additionally described the use of Multicast protocols to support the one-camera-to-many-viewers nature of the surveillance system without duplicating network traffic. This Multicast network protocol lends itself well to the present invention. Specifically, the Facial Processor is another 'viewer' on the network and no additional network traffic need be generated for it. Previous disclosures have described the use of Multicast protocol to convey the motion video, and Unicast protocols to convey the still-frame images to the image database. In the present invention, the still-frame images may also be conveyed over the network as Multicast data, since there is more than one recipient of the still images.

The subject invention is directed to the overall integration of the Facial Recognition technology with the IP camera network. IP cameras produce a variety of real-time data streams. Motion video may be compressed into two simultaneous transport streams, such as a low-resolution QSIF stream and a higher-resolution SIF stream. (SIF is normally 352×288 resolution, and QSIF is normally 176×144 resolution.) Audio may be captured, digitized into a low-bit-rate stream for transport over the network. In addition, the still-frame images may be captured at a high resolution, say 704×

480, and compressed into image files sufficiently small as to meet system requirements. As previously described, these still-frame compressed image files may be conveyed by the network as a Multicast stream, or as a pair of Unicast streams.

Monitor stations are configured to display the scenes captured by one or more of the networked video cameras. The monitor station may display one or multiple cameras. To conserve system bandwidth and the monitor station processing capacity, larger arrays display the low-resolution QSIF streams, while the single-camera array displays the selected camera's SIF output. The system also supports wireless monitor stations, typically used by guards or other law enforcement personnel who require mobility.

An image server receives and stores still-frame images produced by the cameras for subsequent retrieval and analysis. These still-frame images are ordinarily produced only when the associated camera has detected motion within its field-of-view. The server may additionally be configured to store motion video streams upon detection of motion within its field-of-view. A facial database processor contains a stored database of the Facial Signatures and associated "mugshots" of some previously-defined persons. A facial processor detects faces within a selected camera's captured video, and subsequently derives unique Facial Signatures from the detected faces. Facial Signatures thus detected are forwarded to the Facial Database for correlation with a previously stored 'library' of facial mugshots, associated Facial Signatures, and database images in which the current Facial Signature was previously detected.

In one configuration of the invention an Image Database stores captured still images from the various IP cameras within the network. Each captured image is stored in some predetermined location within the server's file system. Each such image is represented by a unique Image ID number, maintained in a database file. Within the file, each record contains the Image ID number, as well as related data such as the date and time the image was taken, physical location where the image was taken, which camera captured the image, a fully-qualified URL describing where the image is located, and any Facial Signatures which were detected within the image.

In a typical structure for the Facial Signature Database, each unique Facial Signature file contains the Facial Signature data, the subject's name if known, age, weight, aliases if any, URL of a mugshot or separated facial image, URL of a biographical file if any, and image ID numbers of any Image Database records which contain the current Facial Signature.

There are several primary objectives of the invention, directed to the following activities: (1) identifying and looking for suspicious person; (2) providing access control; (3) attendance taking and verification; (4) identification and verification of friend or foe; (5) automated signaling upon verification of an issue; (6) management and distribution of the data; and (7) interconnectivity with other facial recognition databases and with other surveillance systems and equipment.

It is, therefore, an object and feature of the invention to integrate facial recognition technology with other surveillance technology for defining an enhanced multi-media surveillance capability.

It is also an object and feature of the subject invention to provide improved facial recognition capability by utilizing high resolution digital camera technology to capture the image.

It is another object and feature of the subject invention to provide interconnectivity between facial recognition systems and other surveillance systems.

It is an object and feature of the subject invention to provide an IP network capability for transmitting facial recognition data using IP protocol.

It is a further object and feature of the subject invention to provide off network connectivity of the facial recognition database to other database system including national archives and the like.

It is another object of the invention to provide management and distribution of facial recognition data.

Other objects and features of the invention will be readily apparent from the accompanying drawings and detailed description of the preferred embodiment.

BRIEF DESCRIPTION OF THE DRAWINGS

FIG. 5 depicts a typical structure for an Image Database and a Facial Signature Database.

DETAILED DESCRIPTION OF THE PREFERRED EMBODIMENTS

Figure 1:
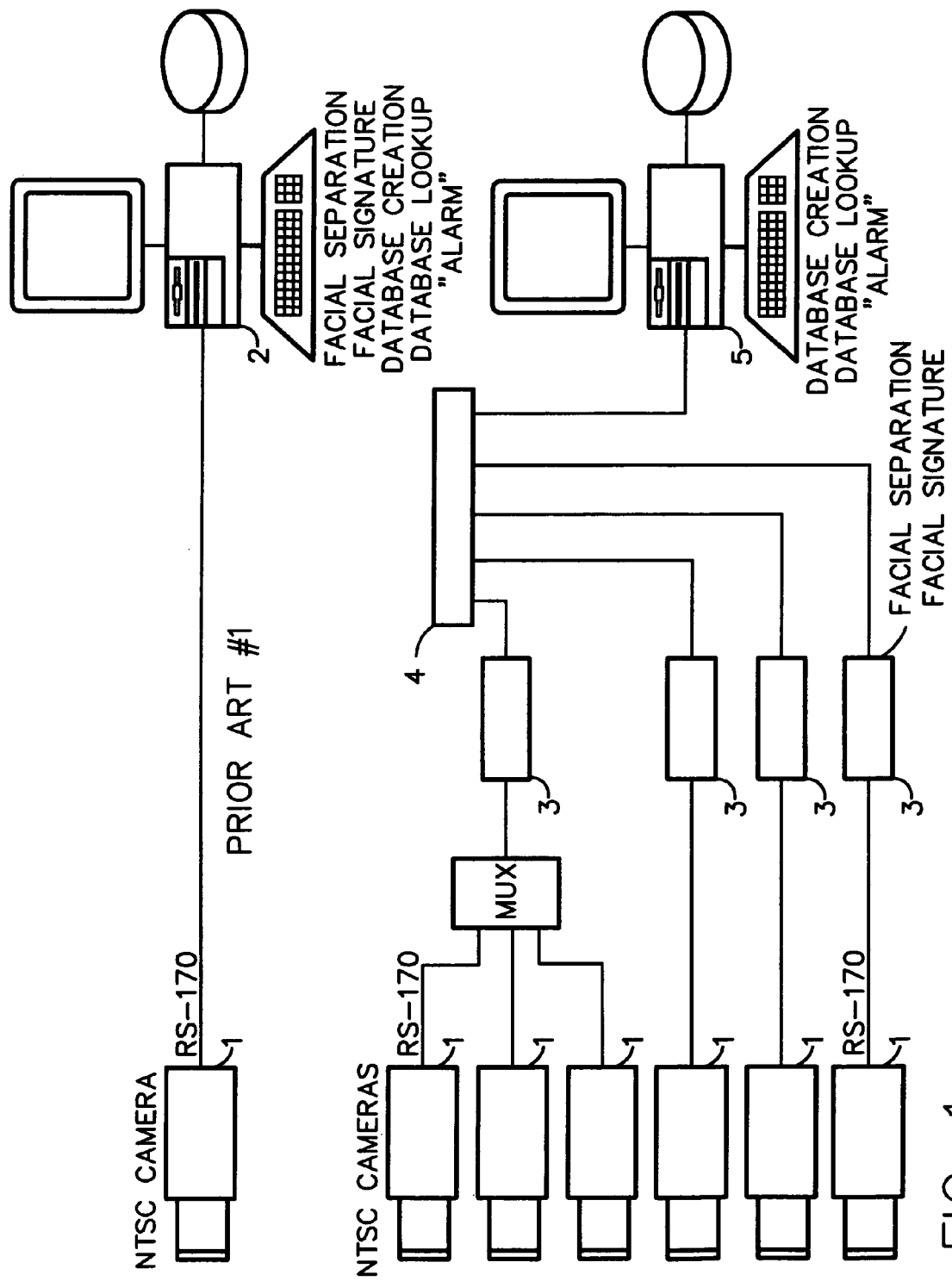
FIG. 1 (Prior Art) is a view of prior art facial recognition systems.

The subject invention provides both the method and apparatus for incorporating facial recognition technology into a comprehensive, multi-media surveillance system capable of: (1) identifying and looking for suspicious person; (2) providing access control; (3) attendance taking and verification; (4) identification and verification of friend or foe; (5) automated signaling upon verification of an issue; (6) management and distribution of the data; and (7) interconnectivity with other facial recognition databases and with other surveillance systems and equipment.

The suspect finding and identification methodology includes:

Running the Facial Recognition on the camera data;
Running the Facial Recognition Algorithms on the Archival Database;
Generating and storing a Facial Signature for each person that was in the field of view for future analysis;

Automatic indexing into the Database based on signature;
When a Suspect match has occurred, dispatch an event alarm to a wire monitor station;
When a Suspect Match has occurred, dispatch an event alarm to a wireless monitor station, such as in a police car or a unit carried by an officer; and
When a Suspect Match has occurred, dispatch and event alarm by telephone, cellular telephone, by pager, by digital pager, by e-mail such as through a security notification system.

The access control function includes:
Integrating the Facial Recognition with an access control database. Store the signature and the access allowed/denied;
Notification on the access denied utilizing the notification system; and
Access/No Access can be shown on monitors station(s).

The automated attendance function includes:
Example—an employee reports to work. The camera detects her/him entering and the employee is logged in. The camera (or another camera) detects her/him leaving and the employee is logged out. This can be automatic, or can be in conjunction with pushing an in/out interface device.
Example—in a school a student enters a room through a door that is surveilled by a camera. As he/she enters, the student is identified and counted in attendance. Time can be part of the equation. If the student is late to class by a few minutes, the student will be counted tardy and the amount of time late recorded. If the student comes very late, attendance will not be recorded.
A camera covering the entire room can also be utilized. The camera will have a view of all seats in the classroom. A "video roll call" of the classroom will be taken in a manner similar to the above.

The identification of friend or foe function includes:
Faceprints of known individuals, such as employees or contract personnel, would be placed in a database.
Areas that are accessible by each person could also be put in the database.
If an UNKNOWN person is identified in a field of view, and alarm condition is generated.
The video is automatically switched at a monitor station and the unknown individual is flagged, such as by a circle or pointer,
The video of the unknown individual would be flagged, such as by a circle or pointer, and tracked as he/she moved around.
If a known (or unknown) person is in a field of view, the time and location is logged on a database.
If it is desired to know where a particular person has been and what they are doing there, the database can be polled and the associated images or video immediately brought up for review.
If a known individual enters an area that is not accessible by that individual, an alarm condition can be generated.
The alarm condition can:
Generate an audible alarm at the area of infringement.
Generate an alarm at a monitor station.
Switch the video to the monitor station.
Start video tracking of the individual.
Log the video to a server.
Log the locations pursued to the server.
Log the time for each of the locations.
Example—in a school, if a student is supposed to be in a particular classroom at a particular time, if he is found in other areas an alarm event can be generated.

The system can log all areas that an individual visits.
The system can show individuals on a map:
By an Icon
By Name
By a small photo of their face
By Function (nurse, doctor, security, maintenance, student, Freshman, Senior, Teacher, Coach, Administration, Security, etc.).
By Department (Maintenance, Library, Engineering, etc.).
Clicking on the icon on the map for each person can give more data if it is not presented on the map display:
Name
ID Number
Department
Rank
Student schedule System Architecture FIG. 1 depicts prior-art Facial Recognition systems. In Prior Art #1, video camera 1 views a scene of interest, and processor 2 analyzes the video signals produced by the camera. The processor performs the steps of:
Facial Separation, e.g., locating human faces within the viewed scene,
Facial Signature generation, e.g., deriving a unique identifying descriptor for the detected faces,
Database Creation, adding said descriptors and separated facial image to a comparison database,
Database Lookup, matching the captured descriptors with previously-captured faces or images containing faces or other relevant data, and
Generating alarms as appropriate.

In FIG. 1, the basic function of the system can be enhanced as depicted in Prior Art #2. As shown, the processing function has been divided among several processors. One or more processors 3 perform the computationally intensive tasks of Facial Separation and Facial Signature generation, while processor 5 performs the less demanding task of database pattern matching. This yields improved system economies and flexibility: cameras and Facial Processors may be added incrementally to the system as needed, and it is unnecessary for each Facial Processor to contain or to access the entire 'reference' database.

Figure 2:
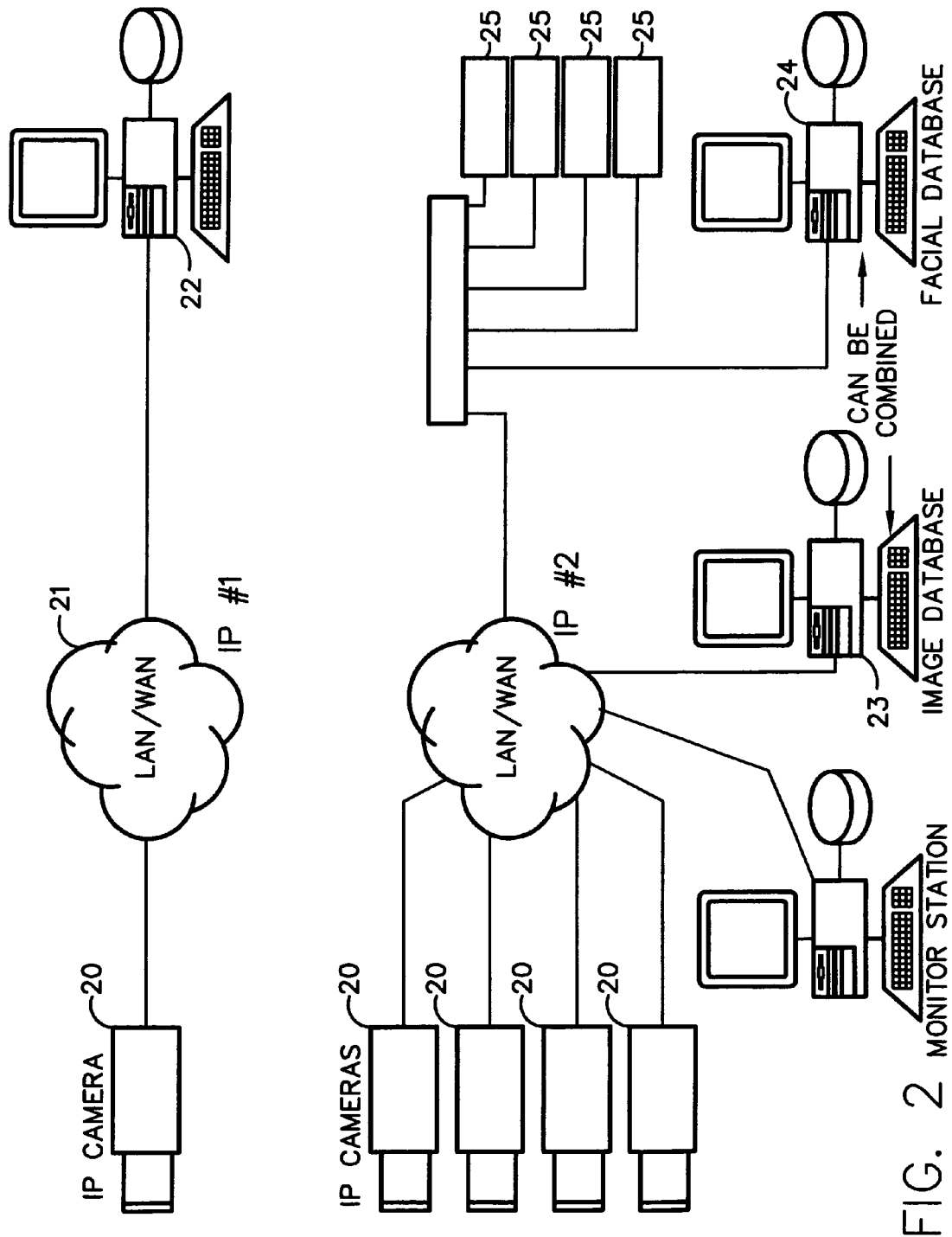
FIG. 2 depicts the application of the basic Facial Recognition technology to a networked surveillance system.

FIG. 2 depicts the application of the basic Facial Recognition technology to a networked surveillance system. Important aspects and features of the system and described in detail herein are the following:
IP Video Cameras Driving Facial Recognition.
Networked IP Video Cameras Driving Facial Recognition.
IP Video Cameras Driving Networked Recognition.
Networked IP Video Cameras driving both Image Database and Network Recognition.
Use of MPEG I-Frames from Stream to drive Recognizer.
Use of High-Resolution Still Streams to drive Recognizer.
Use of Multicast to send Motion Streams to Monitor and Recognizer simultaneously.
Use of Multicast to send Still Streams to Monitor and Recognizer simultaneously.
Tagging of archived images in the database, where faces have been located on that image, with the all of the "facial signatures" of individuals seen in that image. Note that these signatures may be of known or of then unknown persons. This can be done in real-time or post processed.

In the system of FIG. 2, and labeled "IP #1", Camera 20 is an "IP camera", as distinct from the conventional analog camera in the prior art. This IP camera perform additional processing steps to the captured video; specifically the captured video is digitized, compressed into a convenient compressed file format, and sent to a network protocol stack for subsequent conveyance over a local- or wide area network. Typical compression schemes include MPEG, JPEG, H.261 or H.263, wavelet, or a variety of proprietary compression schemes. A typical network topology is the popular Ethernet standard, IEEE 802.3, and may operate at speeds from 10 Mb/s to 100 Mb/s. Network protocols are typically TCP/IP, UDP/IP, and may be Unicast or Multicast as dictated by the system requirements.

The cameras' compressed digital video is transported via Local Area Network (LAN) or Wide Area Network (WAN) 21 to a processor 22 which performs the steps of Facial Separation, Facial Signature Generation, and Facial Database Lookup.

The utility of the system may be enhanced by the increased use of modern networking techniques, as FIG. 2 depicts in diagram "IP #2". In this enhancement, a group of networked processors 25 perform the steps of Facial Separation and Facial Signature generation. This is distinct from the network topology of FIG. 1, in which specific Facial Processors are dedicated to specific cameras. In FIG. 2, the Facial Processors 25 are treated as network resources, and are configured to process video from any networked camera as required. This improves the flexibility and economics of the system. For example, during periods when a particular area is not used, Facial Processors may be diverted from analysis of that particular camera to an area of higher traffic. Also, the workload of a failed Facial Processor may be diverted to a different processor.

Other benefits arise from the topology of FIG. 2. For example, the Facial Database 24 may be treated as a general-purpose network resource, allowing a greater number of cameras 20 and Facial Processors 25 to perform Facial Signature lookups at any given time. Moreover, the digital IP surveillance network is often part of a larger "network of networks", thus allowing the Facial Database to be consulted by devices on a different network. This is useful in cases where different organizations may have compiled different Facial Databases. For example, an airport may maintain a database of the Facial Signatures of all current employees, as well as of past employees. A law enforcement organization may maintain a separate database of known offenders, and an Intelligence organization may maintain a current database of foreign nationals of interest. In the depicted networked environment, the Facial Processors 25 may consult several different Facial Databases, across the LAN or WAN.

An additional benefit of this topology arises from the fact that IP surveillance systems often maintain an archive 23 of stored video or images. Since this archive is generally available on the network, it is possible to use the system to search for faces in archived images, during event reconstruction. For example, the IP surveillance network of FIG. 2 stores captured images or video in an Image Database 23. Often, these images are captured only when the associated camera has detected motion within its field-of-view, thus reducing the storage requirements of the image archive platform. Since the Image Database 23 is a generally-available network resource, it is thus possible to perform the Facial Processing on these stored images as well as on live camera video.

For example, the Facial Processors 25 and Facial Database 24 detect the presence of a person of interest in some live scene. Using the image archive, it is possible to track the person's movements backward in time, thus re-constructing the person's movements through a facility. It is additionally possible, for example, to note whether the person-of-interest may have made contact with other people within the area being monitored. The system may then, upon command, derive a Facial Signature from that 'new' person's image, and add that new Facial Signature to the Facial Database. Historical analysis of the 'new' person's movements through the facility may then be performed, or the real-time location and movements of the 'new' person may be tracked.

FIG. 2 depicts the Facial Database and the Image Archive as two distinct platforms, both resident on the LAN or WAN. It should be noted that these functions are essentially software, hence both functions may be resident on the same physical platform if system requirements so dictate.

Figure 3:
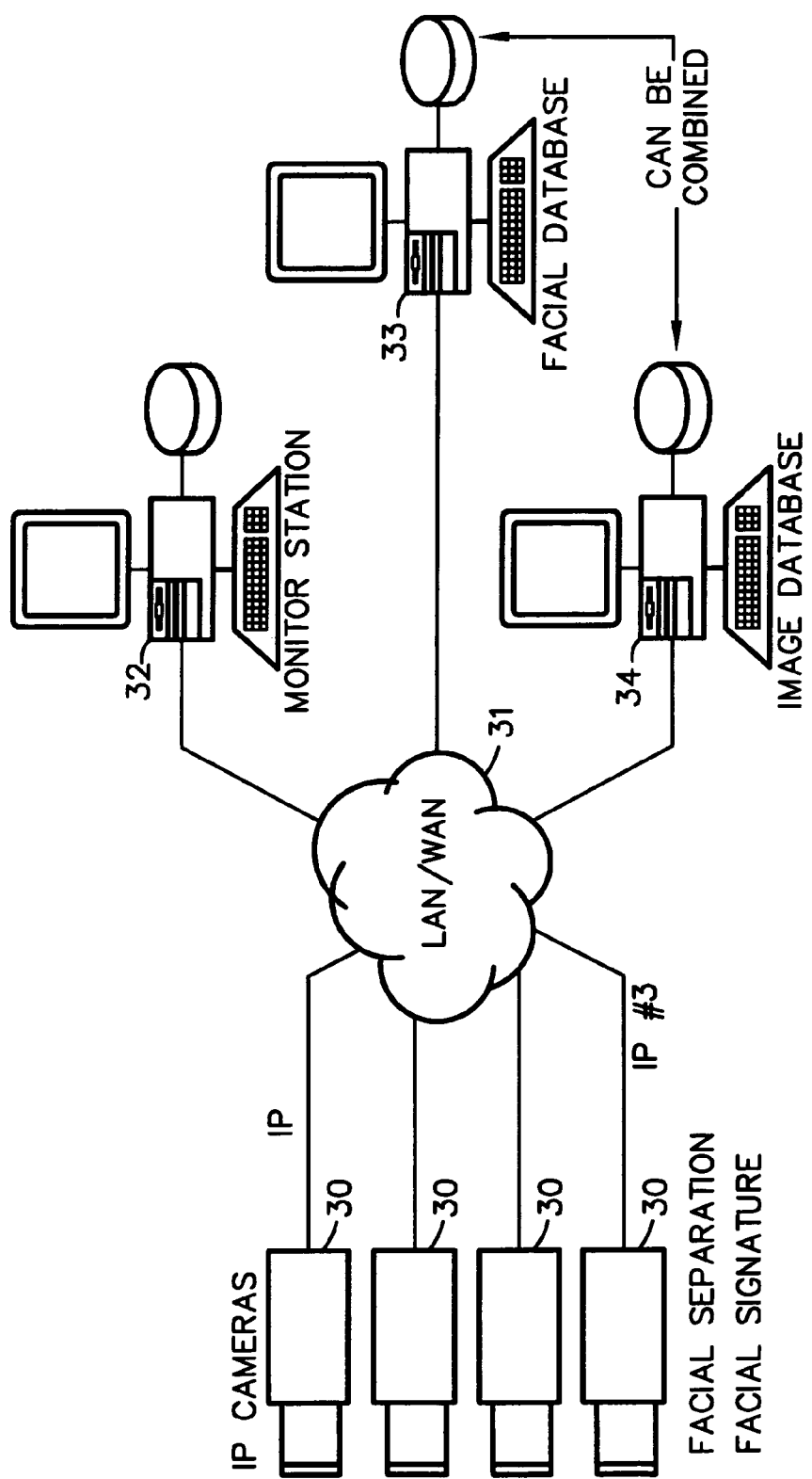
FIG. 3 is an expansion of the system of FIG. 2 showing the IP cameras with additional processing resources capable of performing the Facial Processing internally.

FIG. 3 depicts a further extension of the invention of FIG. 2. In FIG. 3, the IP cameras 30 have been enhanced with additional processing resources, and are capable of performing the Facial Processing internally. The separate Facial Processors of the previous example are eliminated. In addition, this approach allows improvement of the storage efficiency of the Image Database 34, since images may, if desired, only be stored in the Image Archive if a face is recognized by one of the cameras 30, or if a particular predetermined face is detected by Facial Database 33.

The previously listed and incorporated applications and patents have described a surveillance system wherein the IP cameras may produce multiple video streams as the system requirements may dictate. For example, in FIG. 4 the IP cameras 40 may produce several motion MPEG video streams with different bandwidths (for different audiences), and may additionally produce a high-resolution still frame JPEG image for storage in an image database 45. Note that the system of FIG. 2 may utilize any of these video streams for facial recognition. Since the cameras 40 are IP-based, their motion video and still frame video streams are generally available upon demand throughout the network, and either type of video may be used to drive the Facial Recognition system. The still frame images have the advantage of greater resolution, but may be generated less frequently. Motion video sources may produce useful images more often, but at a reduced resolution. This reduced resolution decreases the accuracy of the Facial Recognition process.

The previously listed patents and applications also describe the use of Multicast protocols to support the one-camera-to-many-viewers nature of the surveillance system without duplicating network traffic. This Multicast network protocol lends itself well to the present invention. The Facial Processor is simply another 'viewer' on the network and no additional network traffic need be generated for it. Multicast protocol is used to convey the motion video, and Unicast protocols to convey the still-frame images to the image database. In the present invention, the still-frame images may also be conveyed over the network as Multicast data, since there is more than one recipient of the still images.

Figure 4:
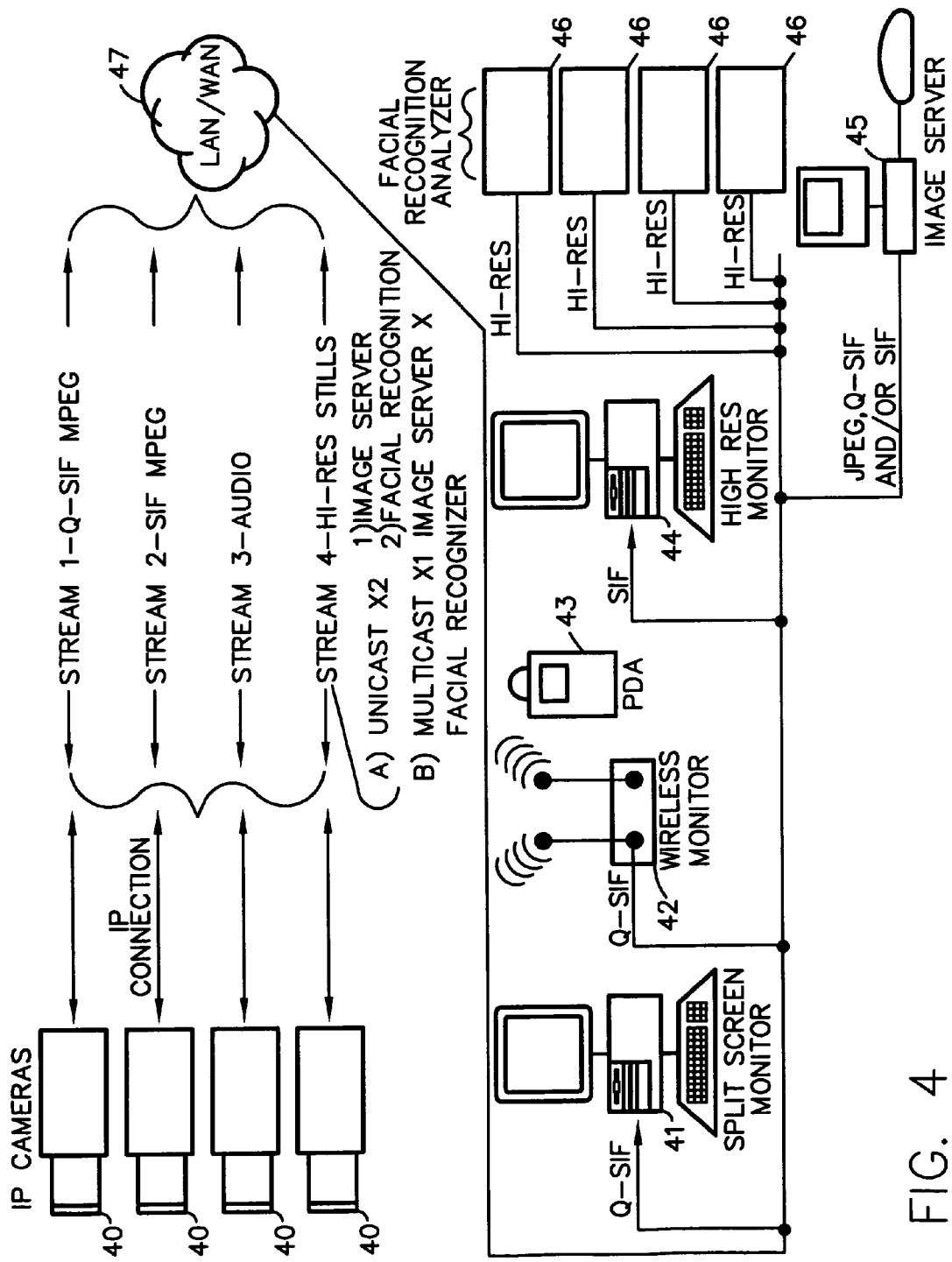
FIG. 4 includes IP cameras for producing several motion MPEG video streams with different bandwidths, and additionally a high-resolution still frame JPEG image for storage in an image database.

FIG. 4 depicts the overall integration of the Facial Recognition technology with the IP camera network. IP cameras 40 produce a variety of real-time data streams as shown. Motion video may be compressed into two simultaneous transport streams, such as a low-resolution QSIF stream and a higher-resolution SIF stream. SIF is normally 352×288 resolution, and QSIF is normally 176×144 resolution. Audio may be captured, digitized into a low-bit-rate stream for transport over the network. In addition, the still-frame images may be captured at a high resolution, say 704×480, and compressed into image files sufficiently small as to meet system requirements. These still-frame compressed image files may, as previously described, be conveyed by the network 47 as a Multicast stream, or as a pair of Unicast streams.

FIG. 4 also depicts the remainder of the surveillance network. Monitor stations 41 and 44 are configured to display the scenes captured by one or more of the networked video cameras 40. The monitor station may display one camera, or may display four cameras in a 2×2 array, nine cameras in a 3×3 array, or sixteen cameras in a 4×4 array. To conserve system bandwidth and the monitor station's processing capacity, larger arrays such as 4×4 display the low-resolution QSIF streams, while the single-camera array displays the selected camera's SIF output.

FIG. 4 additionally depicts a 'wireless' monitor station 43, which receives selected video streams from the network via Wireless Access Point 42. Due to the bandwidth constraints typical of wireless systems, a QSIF stream is normally displayed in the application. Such a wireless monitor station is typically used by guards or other law enforcement personnel who require mobility.

FIG. 4 also depicts an image server 45. This server receives and stores still-frame images produced by cameras 40, for subsequent retrieval and analysis. These still-frame images are ordinarily produced only when the associated camera has detected motion within its field-of-view. Server 45 may additionally be configured to store motion video streams upon detection of motion within its field-of-view.

A Facial Database 47 is depicted in FIG. 4. As previously described, this processor contains a stored database of the Facial Signatures and associated mugshots of some previously-defined persons.

Finally, FIG. 4 depicts the networked Facial Processors 46, which detect faces within selected camera's captured video, and which subsequently derive unique Facial Signatures from the detected faces. Facial Signatures thus detected are forwarded to the Facial Database 47 for correlation with a previously stored 'library' of facial mugshots, associated Facial Signatures, and database images in which the current Facial Signature was previously detected.

FIG. 5 depicts a typical structure for an Image Database and a Facial Signature Database. The Image Database stores captured still images from the various IP cameras within the network. Each captured image is stored in some predetermined location within the server's file system. Each such image is represented by a unique Image ID number, maintained in a database file. Within the file, each record contains the Image ID number, as well as related data such as the date and time the image was taken, physical location where the image was taken, which camera captured the image, a fully-qualified URL describing where the image is located, and any facial Signatures which were detected within the image.

In a typical structure for the Facial Signature Database, each unique Facial Signature file contains the Facial Signature data, the subject's name if known, age, weight, aliases if any, URL of a mugs hot or separated facial image, URL of a biographical file if any, and image ID numbers of any Image Database records which contain the current Facial Signature.

Previous Figures have depicted the presence of a networked Monitor Station. A typical screen layout of such a Monitor Station is depicted graphically in FIG. 6. A Map Pane 61 contains a map of the facility under surveillance. This Map Pane may contain multiple maps, possibly representing different floors or buildings within a facility. Different maps may be displayed through common 'point and click' methods. Each map contains graphical icons representing the location and ID's of the various IP cameras available on the network. Video Pane 62 contains the current video of the selected camera or cameras. When viewing stored images from the Image Database, this Video Pane displays selected images from the database. A Control Pane 63 presents a variety of context-sensitive GUI User controls.

Suspect Identification and Alarm Techniques

With the Facial Processors and the Facial Database available on the LAN or WAN, a number of useful and novel applications become possible.

Within a facility, the various IP cameras view scenes of interest, and one or more Monitor Stations display video from a selected group of cameras. Facial Processors locate faces in video from selected cameras, and derive Facial Signatures from the detected faces. These Facial Signatures are transmitted to a Facial Database, which searches through its stored Facial Signature library for a match.

When the Facial Database scores a 'hit', it forwards appropriate information to the networked Image Database server. This information includes:
  The camera ID and image ID in which the match was found
  The location within the image where the matching face is located
  The stored Facial Signature which matched
  The stored mugshot associated with the Facial Signature
  Related information associated with the Facial Database record, such as the person's name, age, employer, criminal history, etc.

Upon receipt of this data, the Image Database server may perform the following steps:
  The server appends the descriptive information from the Facial Database to the current image that contained the hit.
  The server forwards the 'hit' information to all Monitor Stations on the network. The Monitor Stations thereupon bring the current image, containing the Facial Match, to the forefront of the application screen.
  Monitor stations additionally display the matching face from the database, plus other descriptive information provided by the database.
  The 'hit' event is added to the system log.
  The server likewise alerts any mobile or wireless Monitor Stations of the presence of the 'hit' and it's location.
  The server forwards the matching face and related descriptive information from the Facial Database to the wireless Monitor Station for display.
  The server alerts appropriate personnel from a predetermined list, using e-mail, pagers, or an automated telephone message.
  The server may additionally send a message to an associated facility security system, which thereupon locks entry doors as appropriate.

Personnel Location and Tracking

When the system is enhanced with Facial Recognition technology, a number of useful and novel functions may be added to the basic surveillance system. The basic functions are as follows:
  "Hit" is automatically located on map. Map is brought forward automatically if required.
  A moving "Hit" is tracked on the map.
  "Where is" our person—Locating individual personnel by query, such as security guard or maintenance personnel. Key in query, response is location, map location, and/or video of his location.
  "Where is" Security Guard tracking and logging of locations present and time of presence in database.
  Alarm condition if guard is not seen at specified location during rounds by predetermined time.
  "Where is" Lost Child implementation—local scanner input of photo, activate recognition function.

Automatic tracking of manually "Tagged" personnel of interest—searches forward in real time, backwards in database. Graphical User Interface for "Tagging" suspect of interest.

Use of Image Database—find an unknown suspicious person or person perpetrating an event and "cut" their facial image, reduced it to its signature, then do "find".

The "find" above can be done in real-time to find the person at the present time in the facility.

In real-time, if not found, set "trap" to add to APB (define) list for future ID. Upon finding individual, alarm event is notified, and attached notes as to incident and images can be brought into focus.

The "find" above, can be done against the database, either an image or a signature database, to find other instances that the individual was on premises, and see what he was doing.

The "find" can either look against stored facial signatures, or against stored raw images that are analyzed during post-processing.

Figure 6:
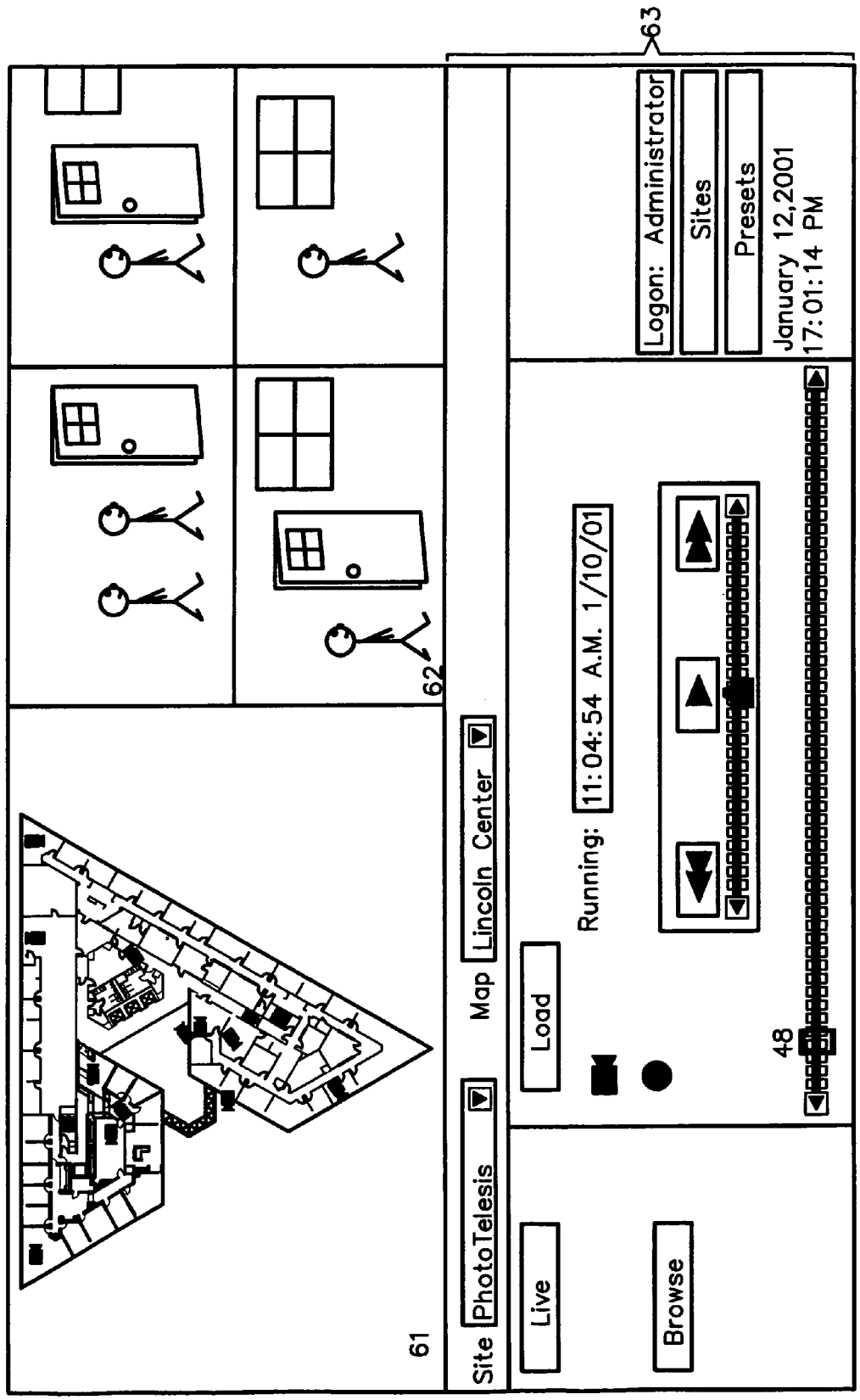
FIG. 6 depicts a typical screen layout of such a Monitor Station.

When the Facial Database detects a 'hit', the location of the hit is depicted on map pane 61 of FIG. 6. The appropriate map may be brought forward, if not already displayed, and the associated camera icon is highlighted, flashed, or otherwise made visually distinct. The subject person's current location within the facility is thus displayed. As subsequent hits are detected, possibly at a succession of cameras if the person is in motion, the associated camera icon is again highlighted, indicating the person's movements.

Inquiries regarding the current location of individual personnel may be performed by the system. As an example, a previously-enrolled person is selected from the Facial Database, using the person's name, mugshot, employee ID, or other stored information. This selection may be made from a Graphical Interface on a networked Monitor Station. The Facial Database is then instructed to look for a 'hit' on that record. When one of the networked IP cameras captures an image, subsequently determined by a networked Facial Processor to contain that person's face, the Facial Database informs the Monitor Station of the match. The Monitor station may then highlight the camera icon of the associated camera, effectively locating the desired person on the map. The Monitor station may additionally bring that camera's video to the forefront, displaying a current image of the desired person.

In an enhancement of this application, the desired person's movements may be compared against a known route, schedule, or database of approved/restricted locations. For example, a security guard may have a predefined route to cover, which defines locations and times of his rounds. The Facial Database may be instructed to look through real-time images for a match with this person. If any such matches are found, they are compared with the times and locations defined by the guard's predefined schedule. If the guard successfully follows his usual rounds, the Facial Database can log this in a security log, including times and locations of the guards' route. If, however, the guard is not detected at the predefined location and/or time, this fact may be logged and, optionally, a system alarm may be generated to notify appropriate security personnel. Additionally, it is possible for the system to detect any non-approved persons in those areas, and generate an alarm. For example, a night guard may have a predefined set of rounds to cover. The system may detect the presence of the guard at the correct times and locations, and note this in a log file. Detection of the guard would not cause a system alarm, however, the detection of any other personnel at those times and places would generate an alarm. Likewise, detection of that guard at an unexpected location or place would generate an alarm. Note that it is not necessary for said 'other' personnel to have been previously enrolled in the database; the mere detection of any Facial Signature other than that of the predefined guard would generate a system alarm.

In a Hotel application, hotel guests may be enrolled into the system at the time of registration. Hotel employees may likewise be enrolled into the system at the time of their employment. The system may be instructed to log the time and location of each successful facial detection, whether a database 'hit' occurs or not. If the facial detection does not match any person enrolled in the Facial Database, the system may generate an alarm, and indicate on a networked Monitor Station the location, and live video, where the face was detected. By way of example, common hotel burglars are thereby automatically detected and recorded by the system, and the system can be instructed to generate an alarm upon the next occurrence of this person. On the other hand, if the detected face is enrolled in the Facial Database, the system may determine what action to take based upon a pre-defined set of rules. For example, if a previously-enrolled guest is detected on the correct floor, then the event is logged but no alarm is generated. If the guest is detected on the wrong floor, the event is logged and an alarm may or may not be generated based on a pre-defined qualifier. An employee may be detected, and an alarm may or may not be generated based on the employee's schedule or authorizations. For example, a cleaning lady on the correct floor at the correct time would not generate an alarm, but the same person on the wrong floor may generate an alarm.

In an airport security application, all persons who successfully pass through a security checkpoint are photographed and enrolled into a networked Facial Database. In addition, the person's itinerary is recorded into the database. This Facial Database may then be shared among several airports. Thus, in any airport:

Detected faces that do not match any Facial Database entry may generate an alarm, directing security personnel to the location of the 'unknown' person, and may cause a suitable networked monitoring Station to display the real-time video.

Detected faces that match an approved passenger in the Facial Database may be compared with the person's itinerary for that trip. If the passenger is in some location or airport that does not match the passenger's itinerary, then security personnel may be alerted to the person and to their location.

Personnel who attempt to board an aircraft without having been enrolled into the Facial Database may generate an alarm, and may be detained by security personnel.

Airport employees who may be in unauthorized areas, or who may attempt to approach or board an aircraft, may generate an alarm to appropriate security personnel.

In a useful enhancement of this application, a previously unknown person may be 'enrolled' into the Facial Database, and a facility-wide search may be commenced. A lost child, for example, may be enrolled into the system through the use of a photograph scanned into the Facial Database. In lieu of a photograph, all children entering some facility, such as an airport or theme park, may be photographed and enrolled into the Facial Database. The Facial Database may then search all real-time camera video for a match with the enrolled child. When a networked IP camera produces video which is subsequently determined to contain the lost child's face, one or more networked Monitor Stations alert security personnel of the event, and provide location and camera video of the lost child. Security personnel may then be dispatched to the location of the child.

Other applications of personnel tracking may require that a person be manually 'enrolled' into the Facial Database. For example, a person seen in a live image may be 'tagged' by an operator at a Monitor Station, whereupon the 'tagged' person's Facial Signature is added to the Facial Database. This is accomplished through the use of a GUI, wherein a specific still-frame image (or a frozen frame from a moving image) is displayed to the Monitor Station operator. The operator selects the desired face from the displayed image, through the use of a mouse or equivalent pointing device. The selected face is then separated from the image, the Facial Signature is derived, and the Facial Signature is added to the Facial Database. The operator is prompted to provide other pertinent information as appropriate to the application, such as a description of the observed event.

The Facial Database may then be instructed to flag an operator whenever the 'tagged' person's image appears in any of the real-time images captured by the networked IP cameras. If the 'tagged' person's face is not observed by the Facial Database within some predefined time interval, then the Facial Database may be instructed to add the person's Facial Signature to a 'watch list' within the Facial Database. If the person's Facial Signature is subsequently detected by the Facial Database, then an alarm is generated, and selected Monitor Stations 'pop' the relevant information onto the Monitor Screen.

Alternatively, the Facial Database may be instructed to search through the Image Database for all occurrences of the 'tagged' person's Facial Signature. This search may be made against the Image Database, or against the Facial Signature database, which keeps a record of all image filenames in which the selected Facial Signature occurs.

Law Enforcement

The invention has applications in day-to-day law enforcement:
Police car has on-board suspect database or link to database. When an officer stops a suspect, lookup occurs.
A policeman sees a suspicious person, it is logged into a database along with notes from the officer. That information is then disseminated to other officers using facial key. If that suspect is encountered again by the same or a different officer, previously collected information will be available.

The surveillance network may include the use of wireless, mobile Monitor Stations as well as the use of wireless IP cameras, all of which are part of the overall IP surveillance network. A patrol officers squad car may be equipped with both a wireless IP surveillance camera, as well as a wireless Monitor Station. When an officer stops a suspect, the suspect's image may be captured by the car's wireless surveillance camera. The captured image may then be forwarded to a networked Facial Processor, which derives a Facial Signature from the suspect's image. This Facial Signature may be forwarded to the Facial Database, which looks for a match between the suspect's Facial Signature and any Facial Signatures which may have been previously recorded. Thus, Suspects may be quickly and accurately identified during the stop.

In another application, a suspicious person's image is captured by a wireless IP surveillance camera, and the Facial Signature is generated as before. The Facial Signature is stored in the Facial Signature database, along with other information collected by the officer, such as location, time, type of activity observed, and so on. This information is then available to other officers via the Facial Signature database. If another officer encounters the person, the person's image may be again captured, and the ensuing Facial Signature match may alert the officers as to the previous suspicious activity. In this way, a person's behavioral pattern may be easily and systematically detected and recorded, such as a person who may be 'casing' a bank prior to a potential robbery.

Attendance Logging

The surveillance network, as supplemented with the Facial Recognition technology, finds usefulness in daily attendance applications:
Students logged in to class and time stamped. By comparison to schedule database, create Automatic Absentee and Tardy logging and notification.
Automatic correlation of absent and tardy people that are found in other areas. Alarm conditions can be generated, video selected on monitor stations, icons brought up on maps.

For example, an IP camera may be trained at a classroom doorway, so as to capture facial images of attendees. Alternatively, the camera may be positioned to view the entire room. In either case, the images thus collected may be used to find faces, derive Facial Signatures, and compare a list of persons present to a class schedule database. This effectively automates the process of attendance taking. The system may thus record attendees, plus absentee or tardy students.

The system may additionally correlate the real-time list of tardy or absent students against Facial Signatures of students detected in other areas of the school. In the event of a database 'hit', the system may generate an alarm, and display the surveillance image of the student. The Monitor Station may additionally display relevant student information, such as name, current location, classroom where the student is scheduled to be, or prior attendance information.

Secure Area Patrol

In secure areas where access by authorized personnel is strictly controlled, the system has important applicability both in monitoring and in controlling access. Features include:
Known personnel approved for specific area access are not alarm events if seen. All others are alarm events.
Known personnel approved for specific area access at specific times and dates are not alarm events if seen. All other personnel are alarm events, or known personnel outside of approved area at approved time are alarm events.
Hotel Example: Registered guests and hotel personnel logged into database. Tracking of areas covered logged, but not alarmed. All others tracked and alarmed. Time and area qualifiers also may be used, such as a guest on the wrong floor.
Multi-Level Alarms, such as a registered guest on the right floor would be a condition green, on a wrong floor would be a condition yellow, a fired employee any place in the building would be a condition red.
Airport/Transportation application: A problem is people in airports skipping or passing security in smaller airports where security is minimal, then flying to a major airport and having full access to flights (connections) without further security checks. The present invention addresses this by capturing an image of every person who is security checked at any facility. Their facial signature is then added to the "OK" list for that day, or for that specific itinerary and time frame. The facial signature can then be forwarded to other airports. In those airports, if any individual appears behind the security check area who has not been properly cleared by security, then an alarm is generated so that individual can be investigated. Personnel, such as airport employees, who try to board planes without being passengers or passing through appropriate security can also be apprehended by use of cameras monitoring boarding.

Panic Button Integrating

My previously mentioned applications and patents describe a personal 'Panic Button', to be used by teachers or other personnel who may need to alert security personnel during an emergency. The addition of Facial Recognition technology to the networked surveillance system, also previously described, enhances the utility of the Panic Button.

Personnel carry a radio transmitter with a button. When an event button is pushed, the transmitter relays to a receiver that relays to the network the type of event (security request, medical request, fire request, etc.) and the individual who generated the event. The facial recognition system would then look for the last known location of that individual, and identify the event in that area—such as map indication, camera selection, and response personnel dispatch.

In an example application, the panic button transmitter may contain one or more pushbuttons labeled, for example, 'FIRE', 'MEDIC', 'POLICE' and so on. When the user presses a button, an internal processor composes a message which encodes the identity of the person and the nature of the emergency (as derived from which button was pressed). This message is then transmitted to one or more networked receivers, and is displayed on one or more Monitor Stations. Security personnel may then be dispatched to the person's location as required.

It is often difficult to determine, with any accuracy, the exact location of the person who signaled the emergency. With RF-based systems, the location of the transmitter may only be determined to within the working radius of the receiver(s) that detected the transmission. Typically, such receivers have a fairly broad coverage area, so as to minimize the total number of receivers required to completely cover the facility. Thus, localization of the person sending the alarm is of poor accuracy.

With the addition of Facial Recognition technology to the network, this problem is solved. When a networked Panic Button receiver detects a transmission from a known person, the Facial Database looks up the person's Facial Signature, and proceeds to search all incoming video for a match. This localizes the person to within the field of view of one particular camera. The system additionally displays the current video from that camera.

Moreover, if the Facial Database fails to detect the person's Facial Signature in any current video, then the Facial Database may be instructed to search the Image Database for the person's image. Such a search would start at the most recently stored images, preferably starting with previously known locations, if any, where the person was scheduled to have been. When a match is detected, the Monitor Station may be instructed to display the most recent image containing the person's image.

Intelligent Response Dispatch

Certain types of security alarm events may require the dispatch of specific types of personnel:

Events that require response, such as fire alarms, alarm system triggers, facial recognition "hits" on suspects can be geo-located by some means, such as fixed sensors at known locations, or facial recognition events. When the location of such an event is determined by the system, the location of appropriate response personnel based on last known facial recognition can be utilized. For example, if a "security" panic button is pushed and location determined, the closest security guard to the area of the alarm as determined by the facial recognition system can be dispatched.

Use of Access Point determination communication links to a mobile guard station will identify area that the guard is in. Dispatch of closes response person can then be accomplished.

For example, a fire alarm might require the immediate dispatch of firefighters, while a medical alarm might require the immediate dispatch of a nurse or doctor. A security violation at an entrance door may require the dispatch of a security guard.

It may be difficult to provide such immediate personnel dispatch if the location of the various personnel is not known. Addition of Facial Recognition technology to the networked security surveillance system eases, and may indeed automate, such dispatch.

In such a system, all security, fire, medical, or administrative personnel, for example, are enrolled into the Facial Database. Upon detection of a particular type of system alarm, for example a fire alarm, the Facial Database is instructed to search all incoming video for a Facial Signature match with one of a group of pre-enrolled firefighters. When the Facial Database successfully detects one or more of these firefighters, their current location is indicated on the Monitor Station. This indication may be via graphical icons on the facility map, or by displaying the camera(s) which contain their video. In either case, the available firefighters are located, and the nearest ones can be dispatched to the scene of the fire.

AD HOC Database Accumulation

Previous examples have mostly involved the use of a pre-defined database of Facial Signatures. Other applications of the system may involve the use of a Facial Database that is collected over a period of time.

Databases of individuals can be built-up automatically. Link of the surveillance system, with other systems such as ATMs, ticketing systems, and the like can be made. As an individual does a transaction his facial signature is logged. If another transaction is attempted but a different facial signature is involved, and alarm is generated.

A person's image and Facial Signature may be collected as part of a routine transaction, and added to a Facial Database for later use. This approach has merit in transactions involving ATM's, ticketing systems, gas pumps, banking, or a variety of over-the-counter purchase transactions.

By way of example, airline tickets are used under a specific name and a facial signature and an image are collected. If the same name is used again, but a different facial signature is seen, an alarm event is generated. The use of the previously captured image can be utilized for operator intervention to determine what has happened.

Conversely, if the same facial signature shows up again in another transaction, but the name is different, an alarm event is generated and the subject investigated. The use of the previously captured image can be utilized for operator intervention to determine what has happened. This could be a terrorist attempting to travel on a stolen ID, or could be a recently married lady whose name changed. The image can verify it is the same person, investigation would have to address changing names.

In another example, an ATM card or Credit Card is used. The system captures a facial signature for that specific card.

An image of the user is captured and stored as well. If that card is used but a different facial signature is seen, and alarm event is generated. The use of the previously captured image can be utilized for operator intervention to determine what has happened.

In yet another example, prescription drugs are purchased under a specific name and a facial signature and an image are collected. If the same name is used again, but a different facial signature is seen, and alarm event is generated. The use of the previously captured image can be utilized for operator intervention to determine what has happened.

Note that in these cases, where a valid credit or ATM card is used but the Facial Signature does not match prior transactions, the Facial Database alerts other linked systems to perform a search for any transaction involving that ATM or credit card. Alternatively, the Facial Database alerts other security networks to search any available camera video for that person's Facial Signature. Thus, after a person uses a stolen ATM card at one bank, the person's Facial Signature may be forwarded to other banks in the area, which may be instructed to search for any ATM transaction, or any camera video at all which contains the selected Facial Signature.

Trend Analysis

An area can be monitored for repeated (suspicious) access by specific but unknown individuals. If the repeated access is over a selected threshold point, an alarm can be indicated. Images can be stored with attached facial signatures. A search of that facial signature would then bring up all images of that individual.

For example, a bank can have a facial database of all current customers and bank personnel. If an unknown individual appears in the recognition system several times without becoming an employee or customer, this could create an alarm condition. A search by facial signature can go back in the database and allow investigation of what that individual was doing. If it is a known benign individual, such as the postman making mail delivery is seen, a GUI can allow "tagging" that individual from unknown to known. This would prevent generation of future alarms when that particular individual is recognized.

Networked security surveillance systems such as described may use Facial Recognition methods to spot developments or trends that may be of interest. For example, a bank's surveillance network may automatically detect and enroll all faces captured by its network of security cameras. The Facial Database may then be searched for trends, such as a new face that appears on the scene and which becomes persistent or periodic. The Facial Database may then alert security personnel to these detected patterns, via a networked Monitor Station.

Most of these cases will be benign, such as the Postman or perhaps a construction crew doing renovations. An operator at a networked Monitoring Station may add an entry to the Facial Database which defines these regularly-detected Facial Signatures as 'approved', along with appropriate identifying information.

Some of these cases, however, might be people reconnoitering the premises in preparation for a crime. Upon detection of such a person, security personnel may be notified via a networked Monitoring Station, and personnel may be directed to intercept the person immediately, or upon the next detection of the person. In addition, the Image Database may be searched for any occurrences of that person's Facial Signature, as part of the event analysis.

Access Control

In this application, a networked camera captures a person at a door camera, the recognizer identifies the individual, a database lookup occurs to see if that individual is authorized for access at that time and place, access is allowed, a signal is sent to an electric door strike or other control device to allow access.

In the invention, doorways are each equipped with a networked IP surveillance camera, positioned to capture the face of the person seeking entry. When a face is detected at a particular doorway camera, the Facial Database searches for a match between the detected person's Facial Signature, and a Facial Signature in the Facial Database. If the detected person's Facial Signature is found in the Facial Database, on a list of 'approved' persons, the Facial Database commands the electric door 'strike' to open and allow the person entry to (or exit from) the facility.

Curfew Monitoring

Many locations experience problems with curfew violations, where underage persons are present at prohibited locations, or are in public locations after some predefined time. The networked surveillance system, enhanced with Facial Recognition capabilities, may be configured to automate detection of such violations.

A database of affected personnel such as students or minors is created. This can be done at schools, or by means of photos on driver's licenses, for example. Cameras patrolling common street areas are deployed with facial recognition. If such people are detected in the street after curfew time, an alarm is generated and response personnel dispatched.

In the invention, a number of IP cameras are positioned around some area known to be frequented by curfew violators. The networked Facial Database may be loaded with still-frame images and Facial Signatures of underage persons, perhaps from a Facial Database generated by the public schools, or from a Juvenile court, or the like. When the Facial Signature of a captured face matches a face in the Facial Database, police or other appropriate personnel may be dispatched to the location.

Point of Sale Monitor

The system may also be interfaced to a point of sale system, such as a gasoline pump. An image of the person activating the pump is collected. If that individual leaves the store without paying, the facial signature and image of that individual is added to the "drive-off" list. If that individual returns to that store, the pump will be locked out and personnel can be notified of a former drive-off suspect. In addition, drive off facial signatures can be forwarded to other stations to prevent that person from accessing pumps at other locations, and assist in apprehending that person.

Shared Retail "Suspect" Services

Retail establishments can collect images in conjunction with retail transactions such as use of membership cards, checks or credit cards. A facial signature of the associated image is generated. If the transaction "goes bad" the facial signature can be so noted and shared with other retail establishments. This can be within one company, it can be a cooperative service with many members, or it can be an extension of check and credit card verification services. This prevents multiple use of stolen or forged checks, credit cards, and the like.

Passenger & Baggage Tracking System for Air Travel

FIGS. 7 through 15 depict a comprehensive integration of the networked video surveillance system with Facial Recognition technology and with commonplace or legacy airport security measures. These airport security measures include metal detectors, baggage X-ray scanners, scales, and related devices. An integrated network of said devices improves security throughout the air travel system.

Figure 7:
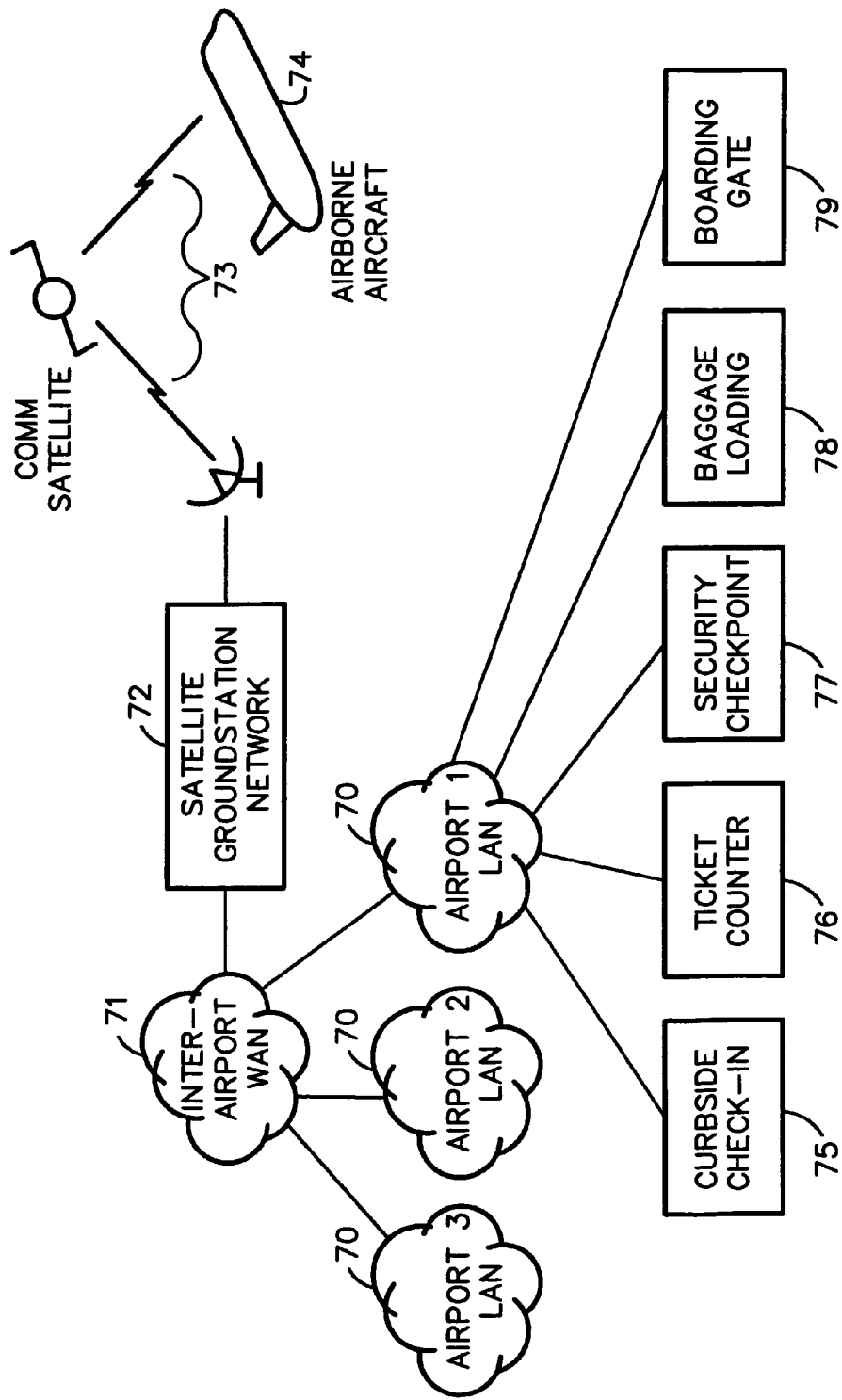
FIG. 7 depicts the overall network.

FIG. 7 depicts the overall network. Various airports 70 each contain a Local Area Network (LAN) to interconnect their various security equipment. Each airport is equipped, for example, with Networked Security Cameras at the curbside check-in point(s) 75, at the ticket counter(s) 76, the security screening point(s) 77, the various gate counters 78, and at the entrance to each jetway 79. In addition, the airport facility is equipped with a group of Networked Surveillance Cameras, providing surveillance coverage of other areas of interest, including concourses, restaurants, baggage handling areas, aircraft loading areas on the tarmac, and so on. These Airport LANs are all interconnected via a national Inter-Airport WAN 71, permitting efficient dissemination and sharing of security data between airports 70 and with en-route aircraft 74 via ground station/satellite communications link 73.

Figure 8:
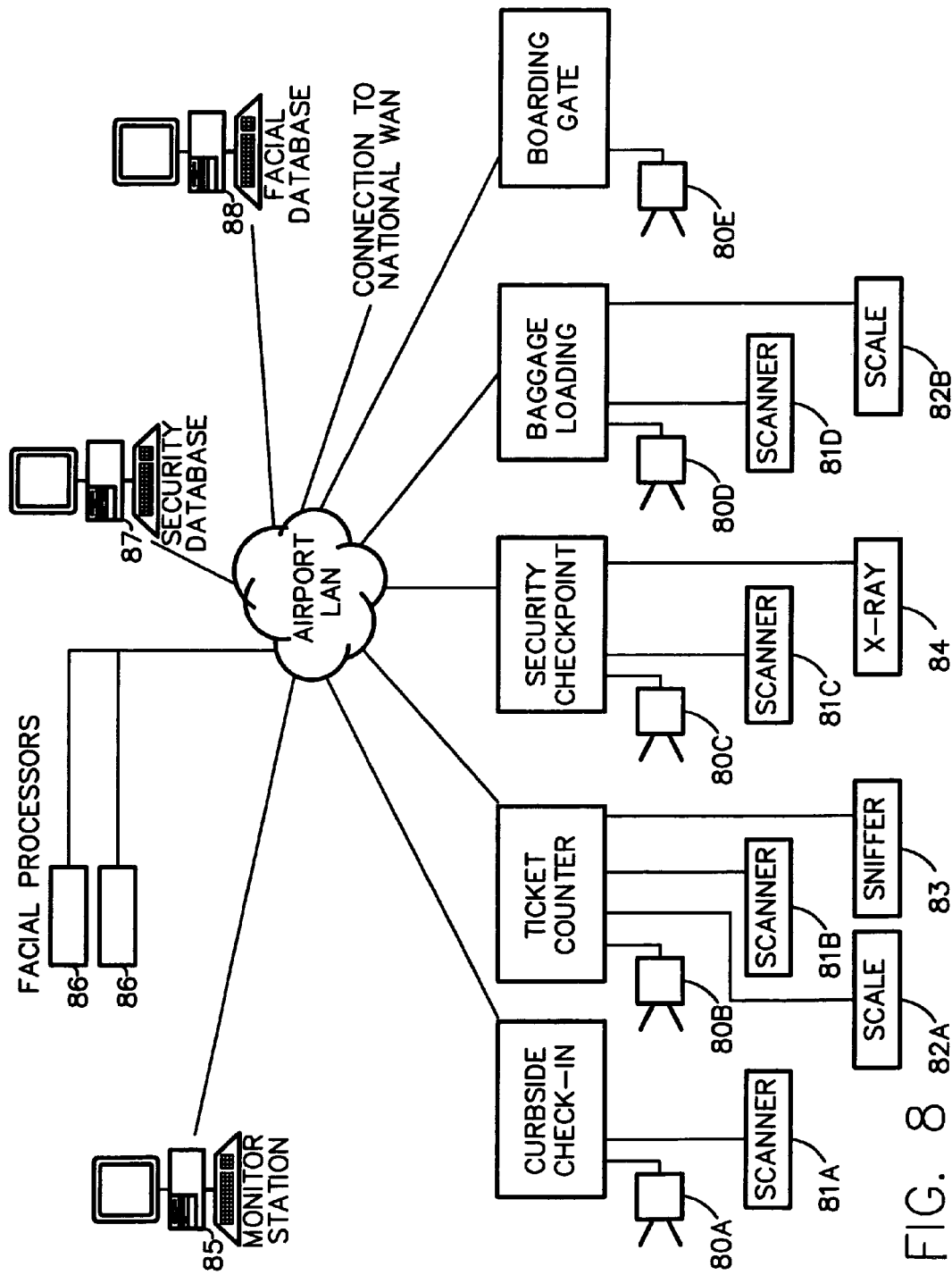
FIG. 8 depicts an expanded network for an airport system.

FIG. 8 depicts the airport network in greater detail. Networked Surveillance Cameras 80A through 80E are stationed at the various security checkpoints as indicated, including curbside check-in, ticket counters, security checkpoints, gate counters, boarding gates, and so on. The Airport Security LAN contains Networked Monitoring Stations 85, Networked Facial Processors 86, Networked Image Database 87, and a Networked Facial Database 88. In addition, the Airport LAN has a connection to the National Airport Security WAN. Additional Networked Surveillance Cameras 80 are installed in various areas of interest within the airport as previously discussed. In addition to the cameras, the security checkpoints contain other Networked devices as appropriate to the function of the checkpoint. For example, at curbside check-in, scanner 81A is used to scan a departing passenger's photo ID and ticket, and thereupon store such captured information into the airport's networked Image Database. At the ticket counter, a scale 82A and explosive sensor 83 are used in screening passengers, again storing such captured information into the networked airport Image Database.

Figure 9:
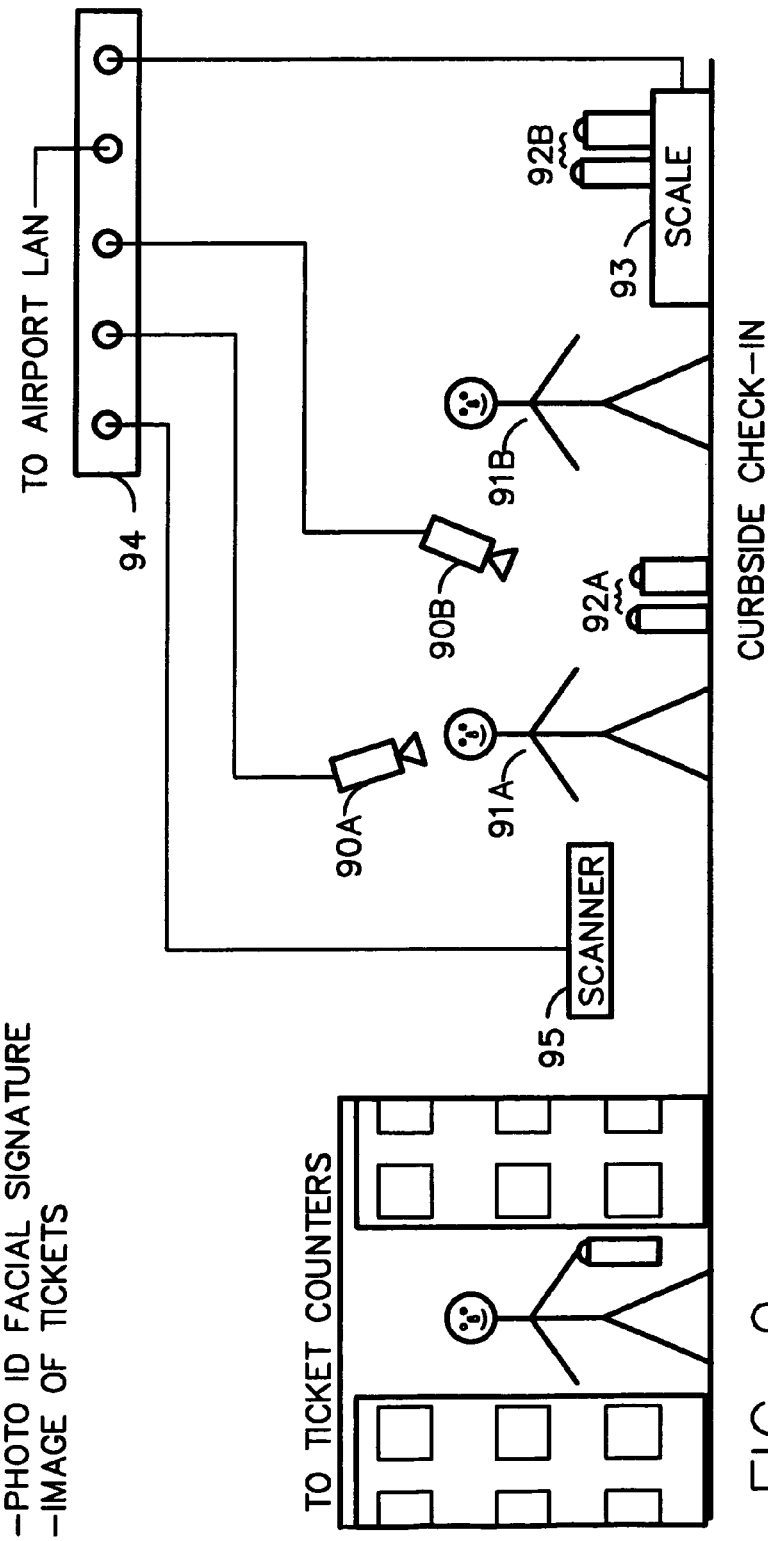
FIG. 9 depicts typical apparatus used at curbside check-in for an airport system.

FIG. 9 depicts typical apparatus used at curbside check-in. Passengers 91A and 91B arrive at curbside for check-in. Networked Surveillance Cameras 90A and 90B capture their image, for subsequent Facial Analysis and enrollment into the airports Networked Facial Database. Their baggage, 92A and 92B respectively, is additionally photographed by cameras 90A and 90B, and is weighed by a networked scale 93, and the resulting weight reading is stored in the airport's networked Image Database along with the passenger's captured Facial Signature. Additionally, the passenger's Photo ID and tickets are scanned with networked scanner 95, and the resulting images are additionally stored in the airport's networked Image Database.

Figure 10:
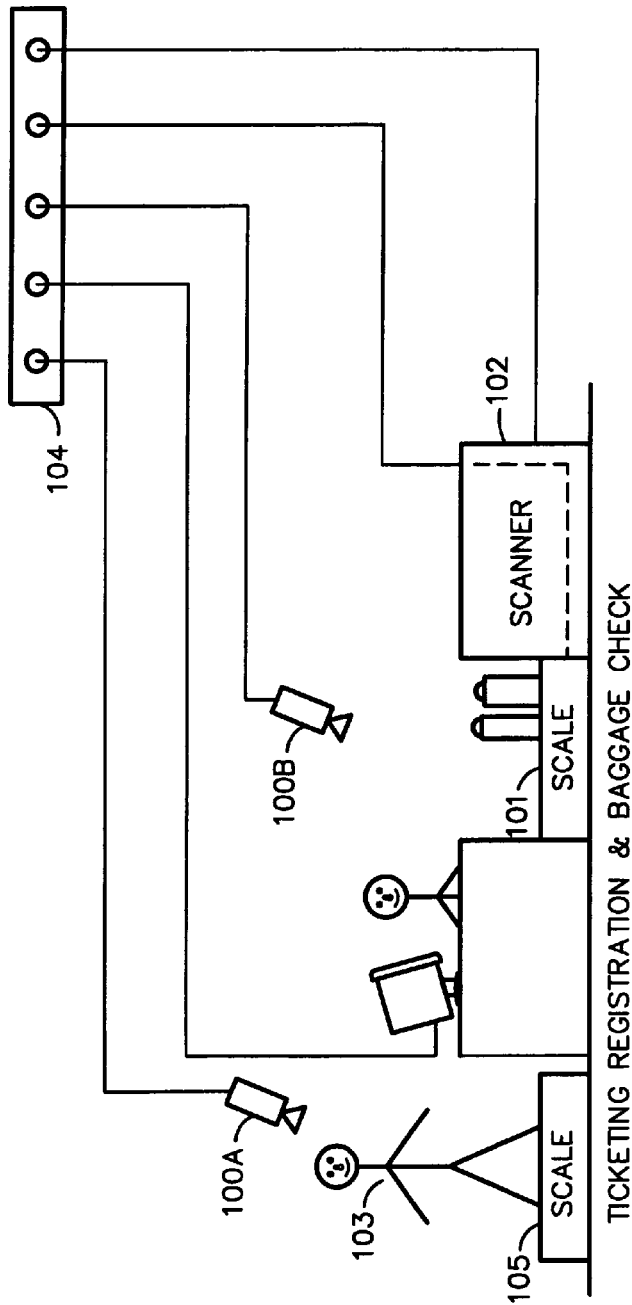
FIG. 10 depicts a typical arrangement at a ticket counter of an airport system.

FIG. 10 depicts a typical arrangement at a ticket counter. Passenger 103 arrives at the Ticket Counter for ticketing and baggage check. Networked Surveillance Camera 100A captures the person's image, for subsequent Facial Processing and Image storage. The passenger's baggage is weighed by networked scale 101, and the baggage is imaged by networked surveillance camera 100B. The baggage's image and weight are transferred via hub 104 to the Airport LAN, and subsequently to the networked Facial Database, and are appended to the passenger's file record in the Facial Database. Additionally, the passenger's ticket and photo ID (driver's license, passport, or the like) are scanned by networked scanner 102, and the resulting images are transferred, via the airport LAN, to the networked Image Database. Other ticket-counter scanners, such as an explosives sensor, an X-Ray scanner, or a scale 105 for weighing the passenger, likewise produce data which are appended to the passenger's record in the Facial Database.

At this point, the person's Facial Signature (as derived from camera 100A's captured image) may be compared with the Facial Signature derived from the person's photo ID scan, for identity verification of the passenger. In addition, data describing the passenger's baggage has been captured by the system and stored in the passenger's Facial Database file, for subsequent bag and identity matching.

Figure 11:
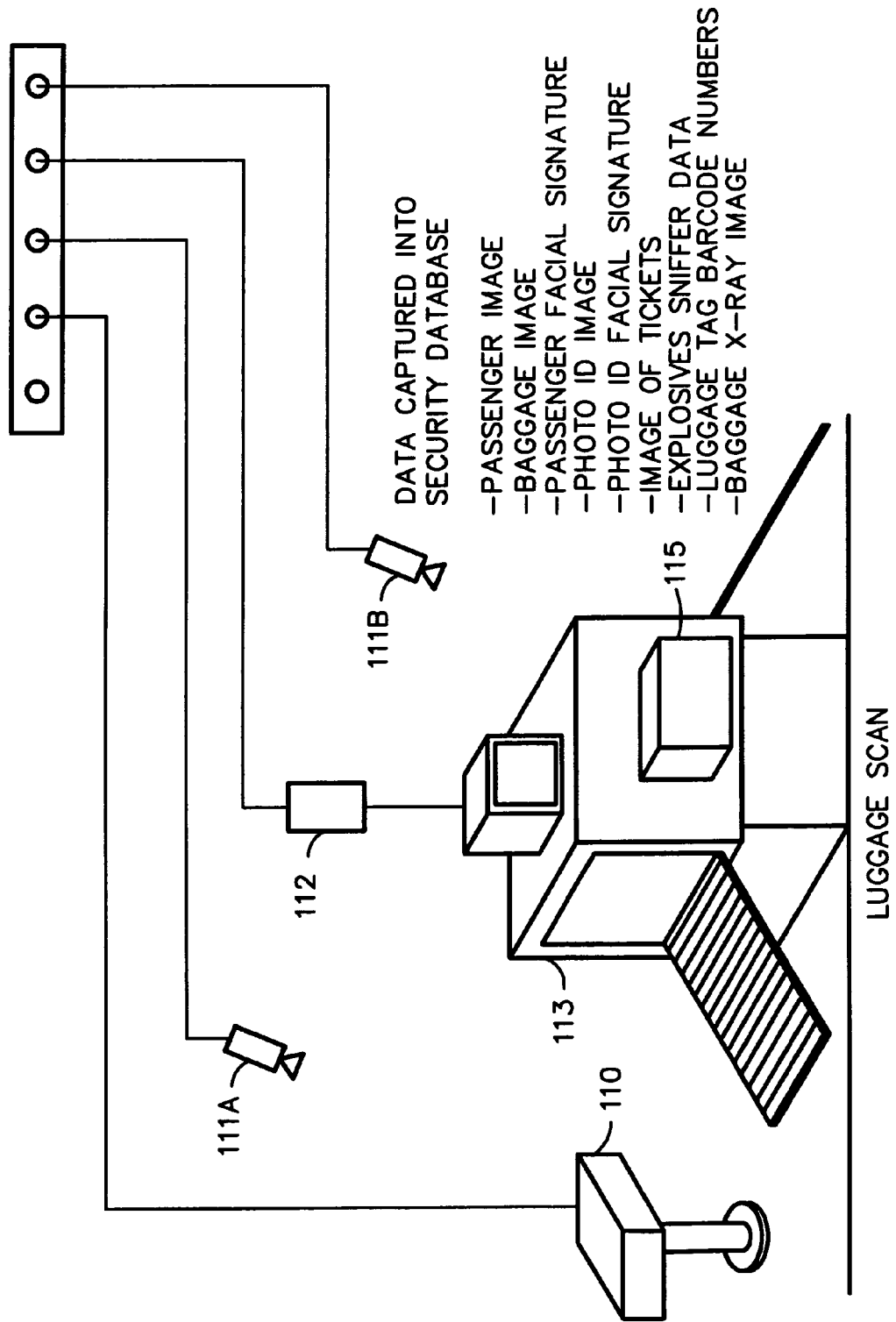
FIG. 11 depicts the equipment at a typical entry point for checked baggage, such as at the ticket counter.

FIG. 11 depicts the equipment at a typical entry point for checked baggage, such as at the ticket counter. A networked image scanner captures the passenger's photo ID, which may be a driver's license or a passport. Camera 111A captures an image of the passenger and baggage at that time, and the ensuing Facial Signature may be confirmed against the Facial Signature derived from the passenger's photo ID. The passenger's checked baggage is scanned by X-ray scanner 113, and the X-ray imagery thus produced is captured by Networked Surveillance Encoder 112, and subsequently appended to the Passenger's record in the Facial Database. An additional Networked Surveillance camera 111B images the passenger's baggage as it leaves the X-ray scanner, and the resulting image is appended to the networked Image Database. A networked explosives sensor 115 likewise produces data descriptive of the baggage, and is likewise appended to the networked Image Database.

Figure 12:
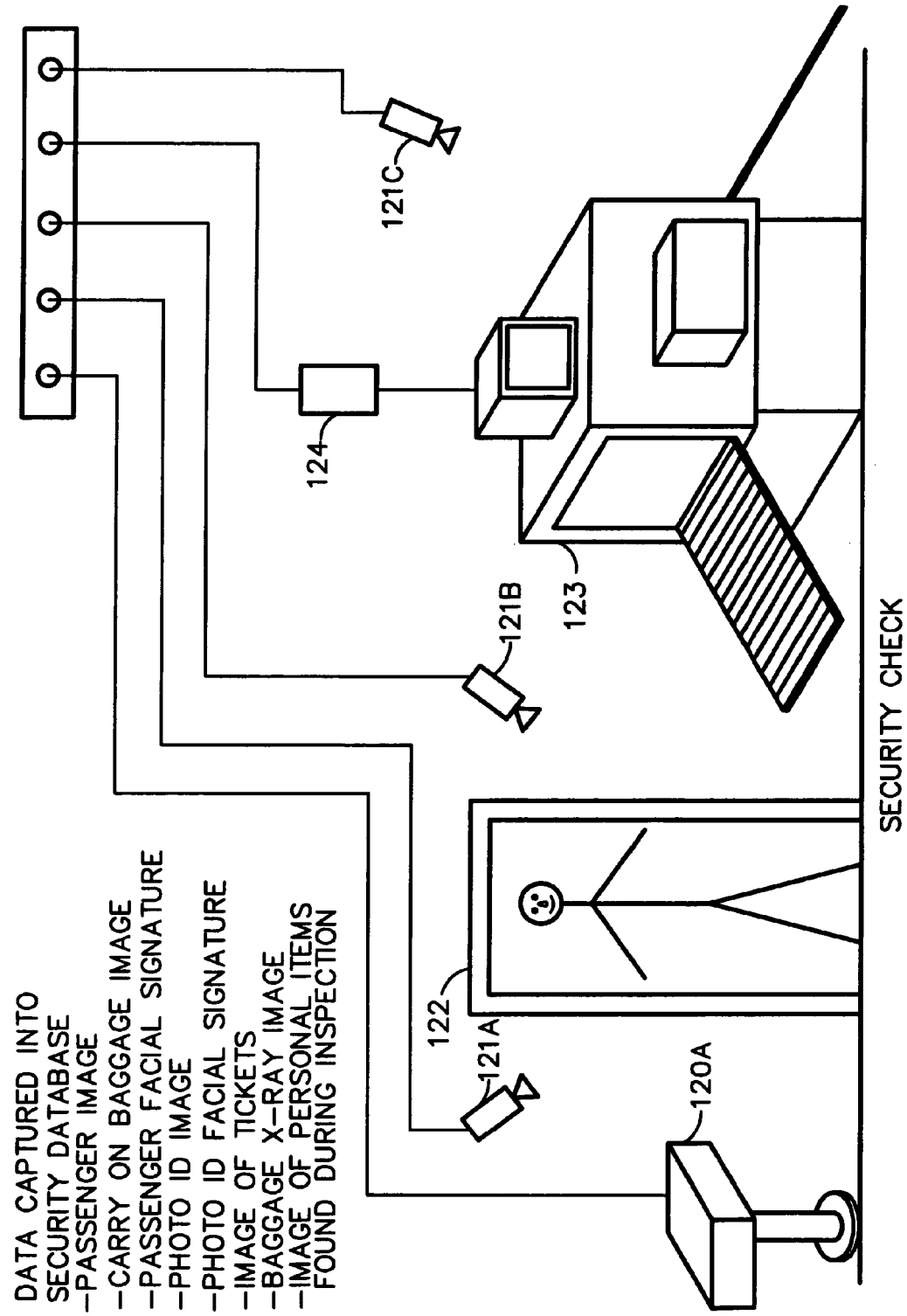
FIG. 12 depicts the equipment at a typical security checkpoint used for passenger screening.

FIG. 12 depicts the equipment at a typical security checkpoint used for passenger screening. Passengers arrive at the security checkpoint and deposit their carry-on baggage on the conveyor belt of X-ray scanner 123. At that time, they are photographed by networked surveillance camera 121A. The image is stored in the network's Image Database, and a networked Facial Processor derives a Facial Signature for the passenger. This data is appended to the existing record in the Facial Database representing that passenger. Additionally, at this time the passenger's photo ID and ticket are scanned into networked scanner 120A, and this data is appended to the passenger's file as well.

A further networked surveillance camera may be used, if needed, at an inspection table, near the passenger metal detector, to capture an image of any personal items from the person's pockets or purse, or other personal luggage, during such an inspection. This image, as well, is appended to the passenger's record in the database. In addition to images from this scan of personal items, data from a networked explosives scanner, and scanned images of the passenger's luggage tag, may be added to the passenger's record in the database.

Security personnel occasionally encounter personal items of an unknown nature, which may require evaluation and approval by qualified supervisors. To improve the speed of the process, supervisors may review real-time networked video of the personal items on the inspection table, and make necessary decisions without having to travel to the security checkpoint.

As the passenger deposits his carry-on baggage onto the conveyor belt of X-ray scanner 123, networked surveillance camera 121B captures an image of the passenger's carry-on baggage, and appends it to the passenger's record in the Facial Database. As the passenger's carry-on baggage is scanned by X-ray scanner 123, networked surveillance encoder 124 captures the scanned image from x-ray scanner 123, and again appends it to the passenger's file. Networked surveillance camera 121C captures an image of the carry-on baggage as it leaves the X-ray scanner 123, and may optionally be positioned to capture an image of both the carry-on baggage as well as the passenger as they retrieve their carry-on baggage from the conveyor. Again, these captured images are appended to the passenger's file.

Figure 13:
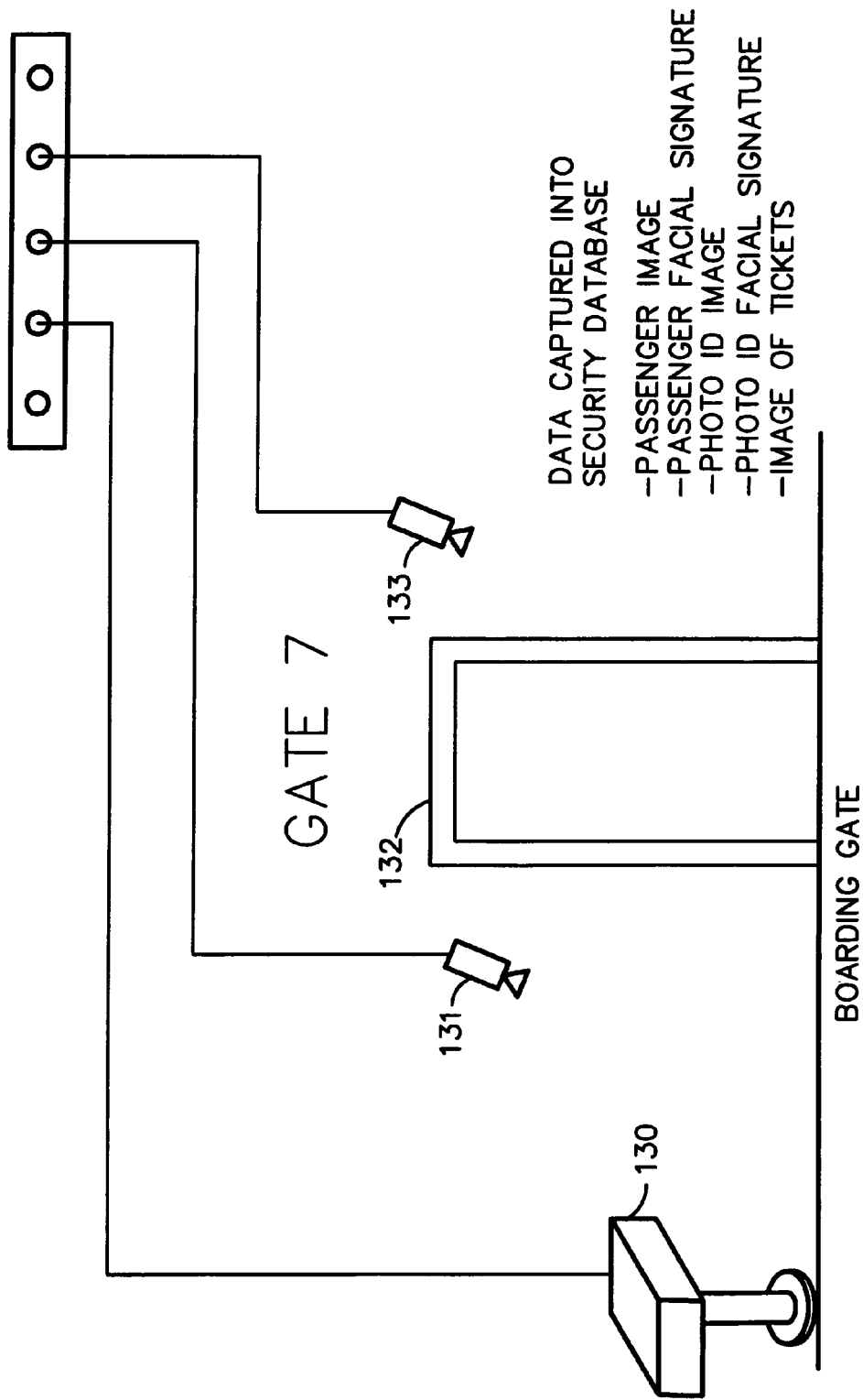
FIG. 13 depicts the apparatus used at a typical boarding gate.

FIG. 13 depicts the apparatus used at a typical boarding gate. At scanner 130, the passenger's ticket and photo ID are scanned, and added to the passenger's database entry. Additionally, the passenger is photographed by networked surveillance camera 133. A facial signature from the passenger's photo ID, and a Facial Signature derived from camera 133's captured image, may be compared to verify the passenger's identity. Either or both of these Facial Signatures may additionally be compared with similar entries previously added to the passenger's database record, again verifying the passenger's identity.

Figure 14:
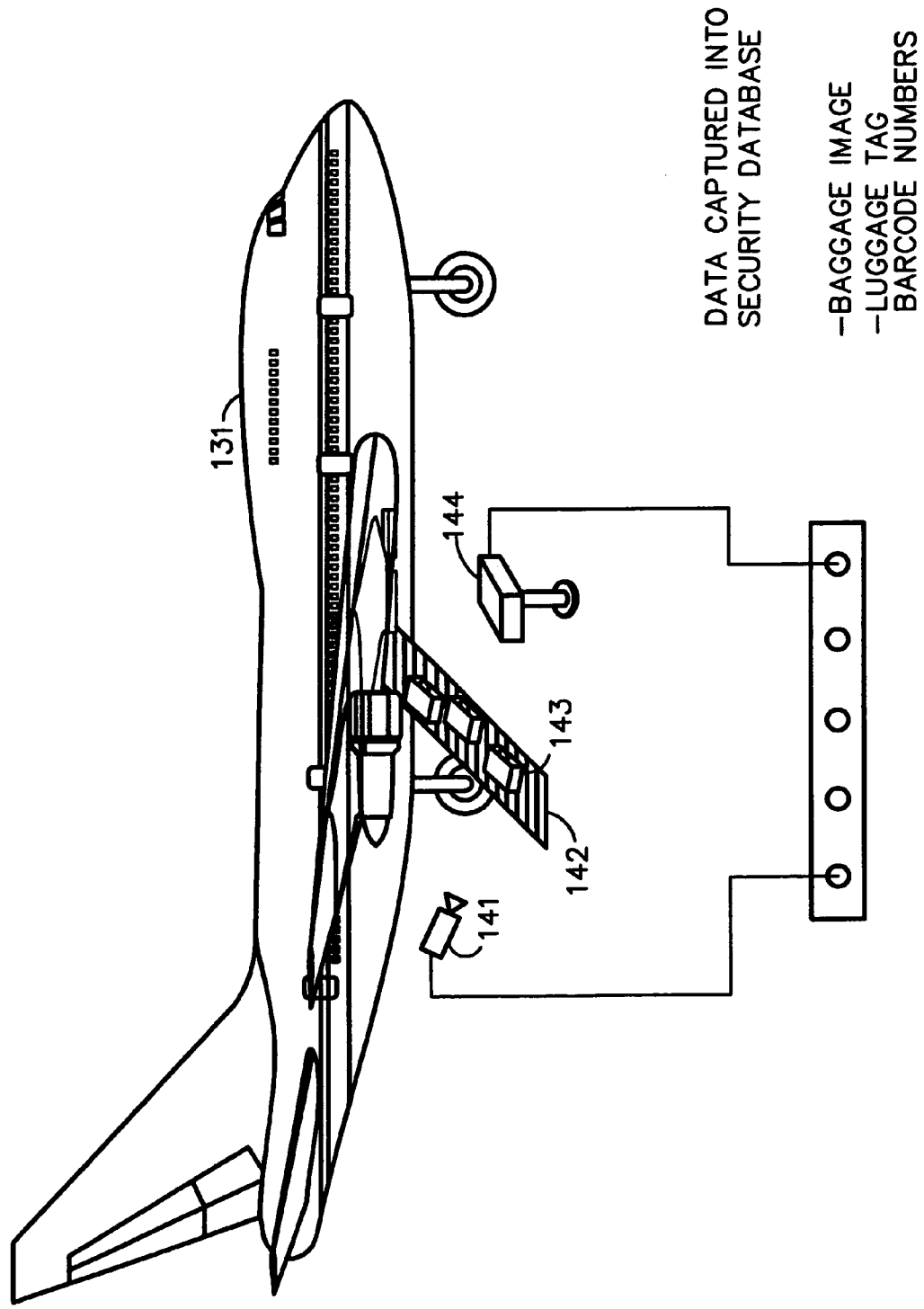
FIG. 14 depicts an aircraft being loaded with checked baggage.

FIG. 14 depicts an aircraft 140 being loaded with checked baggage. As baggage 143 is loaded onto the aircraft via conveyer 142, a networked surveillance camera 141 captures an image of the bag. In addition, a handheld barcode scanner 144 captures the data from the barcoded baggage tag. The bag's image is transferred, via the facility's security LAN, to the Image Database for storage. In addition, the baggage barcode is stored in the passenger's file. This allows subsequent matching of baggage, as loaded onto the aircraft, with baggage that had been previously matched to a known passenger.

Figure 15:
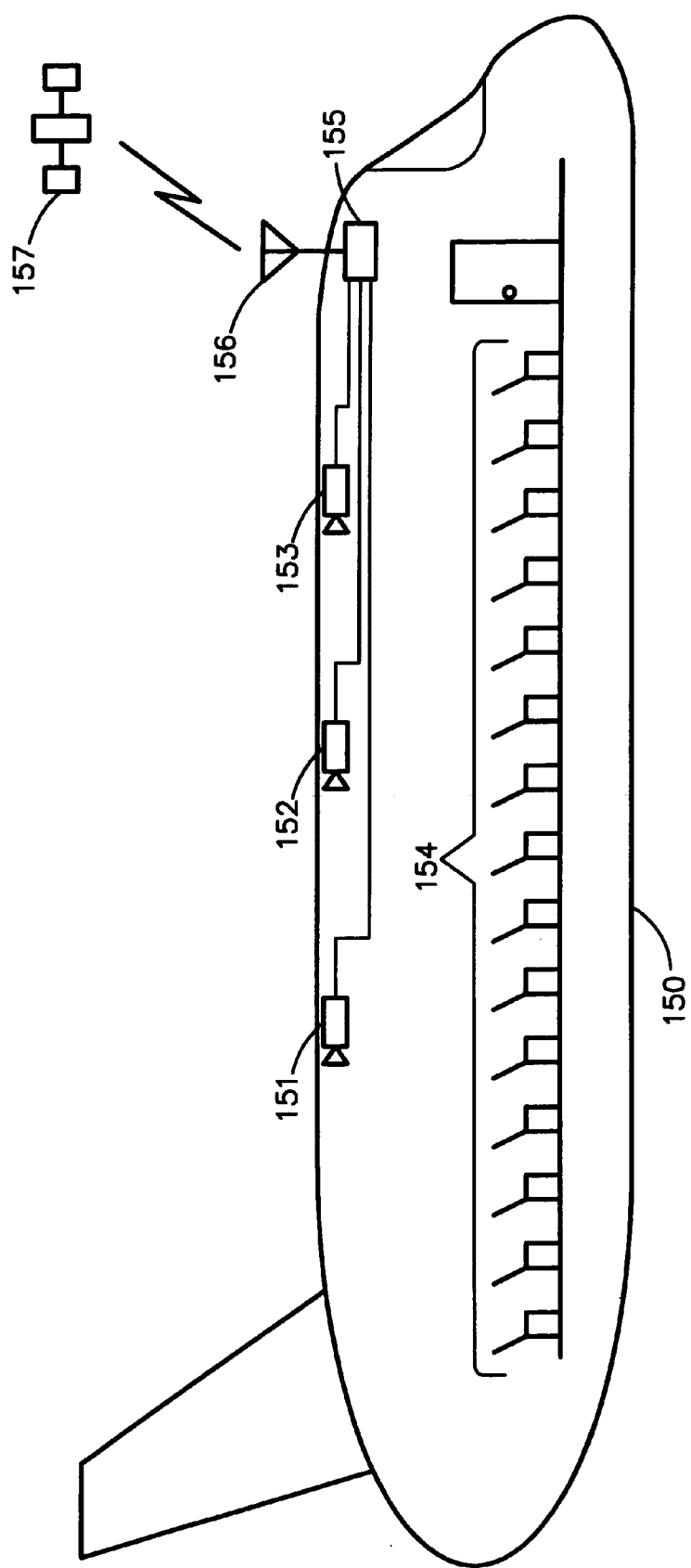
FIG. 15 depicts apparatus installed on board a mass-transit vehicle, herein depicted as an aircraft.

FIG. 15 depicts apparatus installed on board a mass-transit vehicle, herein depicted as an aircraft 150. Several cameras, shown as 151, 152, and 153, are positioned to capture imagery of the aircraft interior. In particular, areas of interest are the entryway door(s), cockpit, and passenger area 154. Video or still-frame images thus captured are conveyed to a satellite communications radio 155, then to satellite 157 via aircraft antenna 156. From the satellite, images are forwarded to a satellite groundstation, as depicted in FIG. 7.

Images captured by on-board cameras 151 through 153 are forwarded to a networked Facial Processor, which extracts Facial Signatures from faces detected in the various images. These Facial Signatures may then be compared with those Facial Signatures of passengers known to be on the flight. In the case of a discrepancy, such as an 'unknown' face present on the flight, or conversely a 'known' face missing from the flight, appropriate security measures may be taken.

While certain embodiments and features of the invention have shown and described in detail herein, it will be understood that the invention encompasses all modifications and enhancements within the scope and spirit of the following claims.

What is claimed is:

1. A surveillance system having at least one camera adapted to produce an IP signal, the IP signal being transmitted over an IP network, the system comprising:

the at least one camera having an image collection device configured for collecting image data;

the at least one camera having an analog to digital converter in communication with the image collection device for convening collected image data from analog format to digital format image data;

the at least one camera having at least one facial processor in communication with the analog to digital converter for receiving the digital format image data, the at least one facial processor being configured to execute with the digital format image data at least one facial recognition algorithm, execution of the at least one facial recognition algorithm with the digital format image data detecting faces when present in the digital format image data, execution of the at least one facial recognition algorithm providing for each detected face at least one set of unique facial image data;

the at least one camera having at least one compressor in communication with the analog to digital converter for receiving the digital format image data, the at least one compressor being configured to execute with the digital format image data at least one compression algorithm, execution of the at least one compression algorithm with the digital format image data providing at least one set of compressed image data;

the at least one camera having a network protocol stack, the network protocol stack being configured for transmitting to the IP network for each detected face the at least one set of unique facial image data, the network protocol stack being configured for transmitting to the IP network the at least one set of compressed image data; and at least one facial signature processor in communication with the IP network, the at least one facial signature processor being remote from the at least one camera, the at least one facial signature processor being configured to receive from the IP network for each detected face the at least one set of unique facial image data, the at least one facial signature processor being in communication with at least one facial recognition database, the at least one facial signature processor being configured to compare with the at least one facial recognition database the at least one set of unique facial image data of each detected face;

wherein the at least one set of unique facial image data for each detected face is provided from the at least one camera to the IP network, such that the at least one set of unique facial image data of each detected face is received by the at least one facial signature processor to be compared with the at least one facial recognition database without preceding transmission of the digital format image data from the at least one camera over the IP network.

2. The system of claim 1, further comprising:

a server in communication with the IP network, the server being remote from the camera, the server receiving the at least one set of unique facial image data for each detected face.

3. The system of claim 2 and further comprising:

the server being in communication with the at least one facial image database, the server being in communication with the at least one facial signature processor, the at least one facial signature processor being configured to compare the at least one set of facial image data with the at least one facial image database.

4. The system of claim 2 and further comprising:

the server being in communication with a third party database for at least one of:

sending, receiving, and both sending and receiving facial image data to a third party.

5. The system of claim 2 and further comprising:

a storage device in communication with the IP network for archiving archival data, the archival data including least one of:

the at least one set of facial image data and the at least one set of compressed image data.

6. The system of claim 5 and further comprising:

a data mining system in communication with the IP network for mining the archival data.

7. The system of claim 1 and further comprising:

the at least one facial recognition algorithm including at least one facial separation algorithm, the at least one facial separation algorithm when executed producing at least one set of facial separation data, the at least one set of facial image data including the at least one set of facial separation data.

8. The system of claim 1 and further comprising:
a plurality of cameras in communication with the IP network for collecting image data at distributed locations.

9. The system of claim 8 and further comprising:
a server in communication with the IP network, the server being remote from the plurality of cameras, the server receiving from each camera respective of the at least one set of unique facial image data of each detected face.

10. The system of claim 1 and further comprising:
a remote station in communication with the IP network, the remote station receiving the at the at least one set of compressed image data, the remote station being configured to display the at least one set of compressed image data.

11. The system of claim 10 and further comprising:
the remote station receiving the at least one set of unique facial image data of each detected face, the remote station being in communication with at least one facial image database, the remote station being in communication with at least one facial signature processor, the at least one facial signature processor being configured to compare the at least one set of unique facial image data of each detected face with the at least one facial image database, the remote station being configured to display a result provided by the at least one facial image processor.

12. The system of claim 10 and further comprising:
wherein the remote station includes at least one of:
a desktop computer, a portable computer, a PDA, and a wireless device.

13. The system of claim 10 and further comprising:
the remote station further including a system map database and a display monitor for displaying the system map, the system map including an icon for identifying the location of the camera.

14. The system of claim 13 and further comprising:
a plurality of cameras in communication with the IP network, the remote station displaying an identifying icon for each of said cameras.

15. The system of claim 14 and further comprising:
a tracking system in communication with the remote station for tracking the progress of an individual as he moves from a field of view of a camera to a field of view of a subsequent camera.

16. The system of claim 1 and further comprising:
an access control device in communication with the IP network, the access control device being responsive to an activation signal, the control device being activated upon confirmation of identity between the at least one set of facial image data and data in a facial image database.

17. A surveillance camera adapted to be connected to an internet protocol network, the surveillance camera comprising:
an image collection device, the image collection device being configured to collect image data;
at least one analog to digital converter in communication with the image collection device for convening collected image data from analog format to digital format image data;
at least one facial processor in communication with the analog to digital converter to receive the digital format image data;
at least one facial recognition algorithm embodied in suitable media, the at least one facial recognition algorithm being executable with the digital format image data by the at least one facial processor, execution of the at least one facial recognition algorithm with the digital format image data detecting faces when present in the digital format image data, execution of the at least one facial recognition algorithm producing for each detected face at least one set of unique facial image data, the at least one facial recognition algorithm including at least one facial separation algorithm, execution of the at least one facial separation algorithm with the digital format data producing at least one set of facial separation data corresponding to the digital format image data, the at least one facial recognition algorithm including at least one facial signature algorithm;
the at least one facial processor being in communication with at least one facial signature database to obtain from the at least one facial signature database a plurality of sets of reference facial separation data, execution of the at least one facial signature algorithm comparing the at least one set of facial separation data and the plurality of sets of reference facial separation data to identify correlations between the at least one set of facial separation data and the plurality of sets of reference facial separation data;
at least one compression algorithm embodied in suitable media, the at least one compression algorithm being executable with the digital format image data by at least one compressor, execution of the at least one compression algorithm producing at least one set of compressed image data; and
a network stack in communication with the at least one compressor, the network stack being configured to transmit to the internet protocol network the at least one set of unique facial image data for each detected face the network stack being configured to transmit to the internet protocol network the at least one set of compressed image data;
wherein the at least one set of unique facial image data for each detected face can be provided from the at least one camera to the IP network.

18. A camera according to claim 17 and further comprising:
a housing, the housing commonly supporting the image collection device, the at least one analog to digital converter, the at least one facial recognition algorithm, the at least one facial processor, the at least one compression algorithm, the at least one compressor, and the internet protocol network stack.

19. A camera according to claim 17 and further comprising:
wherein the at least one facial signature database is stored in local media, the local media being located in the camera.

20. A camera according to claim 17 and further comprising:
wherein the at least one facial signature database is stored in remote media at a location remote from the camera, the remote media being in communication with the internet protocol network, the plurality of sets of reference facial separation data being provided from the remote media to the camera over the internet protocol network.

21. A camera according to claim 17 and further comprising:
the at least one set of compressed image data including at least one set of low resolution compressed image data having a respective low resolution and at least one set of high resolution compressed image data having a respective high resolution, the low resolution being less than the high resolution.

22. A camera according to claim 21 and further comprising:
the at least one set of low resolution compressed image data including MPEG data, the at least one set of high resolution compressed image data including JPEG data.

23. A camera according to claim 22 and further comprising:
the network stack transmitting the at least one set of low resolution compressed image data including MPEG data according to multicast protocol, the network stack transmitting the at least one set of high resolution compressed image data including JPEG data according to one of: multicast protocol and unicast protocol.

24. A camera according to claim 21 and further comprising:
the network stack transmitting the at least one set of low resolution compressed image data according to multicast protocol.

25. A camera according to claim 24 and further comprising:
the network stack transmitting the at least one set of high resolution compressed image data according to one of: multicast protocol and unicast protocol.

26. A camera according to claim 17 and further comprising:
the network stack transmitting a portion of the at least one set of compressed image data according to multicast protocol.

27. A surveillance camera adapted to be connected to an internet protocol network, the surveillance camera comprising:
an image collection device, the image collection device being configured to collect image data;
at least one analog to digital converter in communication with the image collection device for convening collected image data from analog format to digital format image data;
at least one facial processor in communication with the analog to digital converter to receive the digital format image data;
at least one facial recognition algorithm embodied in suitable media, the at least one facial recognition algorithm being executable with the digital format image data by the at least one facial processor, execution of the at least one facial recognition algorithm with the digital format image data detecting faces when present in the digital format image data, execution of the at least one facial recognition algorithm producing for each detected face at least one set of unique facial image data, the at least one facial recognition algorithm including at least one facial separation algorithm, execution of the at least one facial separation algorithm with the digital format data producing at least one set of facial separation data corresponding to the digital format image data;
at least one compression algorithm embodied in suitable media, the at least one compression algorithm being executable with the digital format image data by at least one compressor, execution of the at least one compression algorithm producing at least one set of compressed image data; and
a network stack in communication with the at least one compressor, the network stack being configured to transmit to the internet protocol network the at least one set of unique facial image data for each detected face the network stack being configured to transmit to the internet protocol network the at least one set of compressed image data;
the network stack transmitting the at least one set of facial separation data according to multicast protocol to a remote recipient, the remote recipient being in communication with the internet protocol network, the remote recipient being in communication with at least one remote facial signature processor, the at least one remote facial signature processor being associated with suitable media embodying at least one facial signature algorithm, the at least one remote facial signature processor being configured to execute the at least one facial signature algorithm, the at least one remote facial signature processor being in communication with at least one facial signature database to obtain from the at least one facial signature database a plurality of sets of reference facial separation data, the at least one facial signature algorithm when executed comparing the at least one set of facial separation data and the plurality of sets of reference facial separation data to identify correlations between the at least one set of facial separation data and the plurality of sets of reference facial separation data.

28. A surveillance camera adapted to be connected to an internet protocol network, the surveillance camera comprising:
an image collection device, the image collection device being configured to collect image data of a field of view, the image collection device providing digital format image data;
at least one processor in communication with an image collection device to receive the digital format image data;
at least one facial recognition algorithm embodied in suitable media, the at least one facial recognition algorithm being executable with the digital format image data by the at least one facial processor, execution of the at least one facial recognition algorithm detecting faces when present in the digital image format data, execution of the at least one facial recognition algorithm producing at least one set of unique facial image data for each detected face, the at least one facial recognition algorithm including at least one facial separation algorithm, execution of the at least one facial separation algorithm with the digital format data producing at least one set of facial separation data corresponding to the digital format image data, the at least one facial recognition algorithm including at least one facial signature algorithm;
the at least one facial processor being in communication with at least one facial signature database to obtain from the at least one facial signature database a plurality of sets of reference facial separation data, execution of the at least one facial signature algorithm comparing the at least one set of facial separation data and the plurality of sets of reference facial separation data to identify correlations between the at least one set of facial separation data and the plurality of sets of reference facial separation data; and
a network stack in communication with the at least one facial processor, the network stack being configured to transmit the at least one set of unique facial image data of each detected face to the internet protocol network from the surveillance camera.

29. A camera according to claim 28 and further comprising:
   at least one compression algorithm embodied in suitable media, the at least one compression algorithm being executable with the digital format image data by at least one compressor, execution of the at least one compression algorithm producing at least one set of compressed image data;
   the network stack being configured to transmit the at least one set of compressed image data to the internet protocol network.

30. A camera according to claim 29 and further comprising:
   the at least one set of compressed image data including at least one set of low resolution compressed image data having a respective low resolution and at least one set of high resolution compressed image data having a respective high resolution, the low resolution being less than the high resolution.

31. A camera according to claim 30 and further comprising:
   the at least one set of low resolution compressed image data including MPEG data, the at least one set of high resolution compressed image data including JPEG data.

32. A camera according to claim 30 and further comprising:
   the network stack transmitting the at least one set of low resolution compressed image data according to multicast protocol.

33. A camera according to claim 28 and further comprising:
   a housing, the image collection device, the at least one facial recognition algorithm, the at least one facial processor, the at least one compression algorithm, the at least one compressor and the internet protocol network stack.

34. A camera according to claim 28 and further comprising:
   the network stack transmitting a portion of the at least one set of compressed image data according to multicast protocol.

* * * * *